United States Patent [19]
Walnut et al.

[11] Patent Number: 5,953,388
[45] Date of Patent: Sep. 14, 1999

[54] METHOD AND APPARATUS FOR PROCESSING DATA FROM A TOMOGRAPHIC IMAGING SYSTEM

[75] Inventors: David Francis Walnut, Fairfax, Va.; Carlos Alberto Berenstein, Bethesda, Md.; K. J. Ray Liu, Silver Spring, Md.; Farrokh Rashid-Farrokhi, Greenbelt, Md.

[73] Assignee: George Mason University, Fairfax, Va.

[21] Appl. No.: 08/912,838

[22] Filed: Aug. 18, 1997

[51] Int. Cl.$^6$ ........................................................ A61B 6/03
[52] U.S. Cl. .................................................. 378/4; 378/901
[58] Field of Search .......................................... 378/4, 901

[56] References Cited

U.S. PATENT DOCUMENTS 4,044,260  8/1977  Hounsfield ................................... 378/5
5,576,548  11/1996  Clarke et al. ............................. 250/369

*Primary Examiner*—David P. Porta
*Assistant Examiner*—David Vernon Bruce

[57] ABSTRACT

An algorithm is created and applied to reconstruct the wavelet coefficients of an image from the Radon transform data for use in computed tomography, with a disclosed method that uses the properties of wavelets to localize the Radon transform such that a local region of the cross section of a body can be reconstructed using almost completely local data to significantly reduce the amount of exposure and computations in X-ray tomography. The described algorithm is based on the observation that for some wavelet bases with sufficiently many vanishing moments, the ramp-filtered version of the scaling function as well as the wavelet function has extremely rapid decay, with the variance of the elements of the nullspace is being negligible in the locally reconstructed image.

15 Claims, 18 Drawing Sheets

TABLE I
SPREAD OF WAVELET AND SCALING FUNCTIONS

| Filter | Coefficients | Support | Wavelet Spread | Scaling Spread |
|---|---|---|---|---|
| Haar | 1<br>1 | [0,1] | .3837 | .6900 |
| Linear spline | 0.50000000000000<br>1.00000000000000<br>0.50000000000000 | [0,2] | 0.09167 | 0.3726 |
| Quadratic spline | 0.25000000000000<br>0.75000000000000<br>0.75000000000000<br>0.25000000000000 | [0,3] | 0.01691 | 0.1959 |
| Cubic spline | 0.12500000000000<br>0.50000000000000<br>0.75000000000000<br>0.50000000000000<br>0.12500000000000 | [0,4] | 0.003767 | 0.1389 |
| Degree 4 spline | 0.06250000000000<br>0.31250000000000<br>0.62500000000000<br>0.62500000000000<br>0.31250000000000<br>0.06250000000000 | [0,5] | 0.0009341 | 0.1105 |
| Daubechies 4 tap filter | 0.68301270189222<br>1.18301270189222<br>0.31698729810778<br>-0.18301270189222 | [0,3] | 0.03391 | 0.3449 |
| Daubechies 6 tap filter | 0.47046720778416<br>1.14111691583144<br>0.65036500052623<br>-0.19093441556833<br>-0.12083220831040<br>0.04981749973688 | [0,5] | 0.005446 | 0.1929 |
| Daubechies 8 tap filter | 0.32580342805100<br>1.01094571509000<br>0.89220013842700<br>-0.03957026356000<br>-0.26450716736900<br>0.04361630047420<br>0.04650360107100<br>-0.01498698933040 | [0,7] | 0.001058 | 0.1232 |
| Daubechies 10 tap filter | 0.22641898258329<br>0.85394354270476<br>1.02432694425952<br>0.19576696134736<br>-0.34265671538239<br>-0.04560113188406<br>0.10970265864207<br>-0.00882680010864<br>-0.01779187010184<br>0.00471742793840 | [0,9] | 0.0002376 | 0.08907 |

FIG. 3A

TABLE I
SPREAD OF WAVELET AND SCALING FUNCTIONS (CONTINUED)

| Filter | Coefficients | Support | Wavelet Spread | Scaling Spread |
|---|---|---|---|---|
| Coiflet with 1 moment vanishing | -0.05142972847100<br>0.23892972847100<br>0.60285945694200<br>0.27214054305800<br>-0.05142997284700<br>-0.01107027152900 | [0,5] | 0.0003069 | 0.01613 |
| Coiflet with 3 moments vanishing | 0.01158759673900<br>-0.02932013798000<br>-0.04763959031000<br>0.27302104653500<br>0.57468239385700<br>0.29486719369600<br>-0.05408560709200<br>-0.04202648046100<br>0.01674441016300<br>0.00396788361300<br>-0.00128920335600<br>-0.00050950539900 | [0,11] | 0.000006154 | 0.01307 |
| Near coiflet (5 taps) | -0.05000000000000<br>0.25000000000000<br>0.60000000000000<br>0.25000000000000<br>-0.05000000000000 | [0,4] | 0.001682 | 0.02890 |
| Near coiflet (9 taps) | 0.01250000000000<br>-0.03125000000000<br>-0.05000000000000<br>0.28125000000000<br>0.57500000000000<br>0.28125000000000<br>-0.05000000000000<br>-0.03125000000000<br>0.01250000000000 | [0,8] | 0.00005151 | 0.01632 |
| Near coiflet (12 taps) | -0.00317382812500<br>0.00585937500000<br>0.01904296875000<br>-0.04882812500000<br>-0.04760742187500<br>0.29296875000000<br>0.56347656250000<br>0.29296875000000<br>-0.04760742187500<br>-0.04882812500000<br>0.01904296875000<br>0.00585937500000<br>-0.00317382812500 | [0,12] | 0.000001515 | 0.009547 |

FIG. 3B

METHOD AND APPARATUS FOR PROCESSING DATA FROM A TOMOGRAPHIC IMAGING SYSTEM

This invention was made with government support under Contract No. MIP9457397 awarded by the National Science Foundation. The government has certain rights in the invention.

FIELD OF THE INVENTION

The invention relates to computer tomography (CT) imaging. More specifically, the present invention describes a new method and apparatus for use in CT scanning wherein the wavelet transform is constructed directly from the tomographic data for local image reconstruction from local measurements in such a way as to reduce the required radiation dosage while creating a faster image output with improved resolution.

BACKGROUND OF THE INVENTION

Computer tomography (CT) imaging is a relatively recent development that has captivated the interest of those involved in imaging technology. CT has been most accepted and adopted as standard procedure in the medical field, since it provides a more detailed analysis of internal body parts that do conventional X-rays, it offers more control for setting variables according to the particular focus of the image, and is less costly since the results are immediately computerized, thereby eliminating the time delay and cost involved in the development of X-ray negatives. As a result, leading manufacturers of equipment incorporating CT technology have emerged, such as General Electric's Medical System's Division and Siemens, AG. In addition, numerous smaller companies are now manufacturing CT equipment in this developing and competitive field.

CT equipment consists of apparatus largely incorporating that of conventional X-ray systems, consisting of basis components such as a radiation source for positioning above the subject and a receptor negative plate positioned beneath the subject (FIG. 20). The data generated at the receptor is analyzed using various possible methods known in the field to reconstruct the image of the area targeted on the subject. At the heart of CT equipment is the controller, being a computer with specialized software for controlling the overall operation, including the processing of the generated data.

Some advances in this field fall short of achieving the desired clarity of a reconstructed image. For example, the patent to Katsevich, U.S. Pat. No. 5,550,892, describes a method for determining the location and value of a discontinuity between a first internal density of an object and a second density of a region within the object. However, only relative attenuation data of the radiation beam is determined and used. While this is helpful in enhancing the local tomographic image, the method does not actually reconstruct the image. Its use of LAMBDA as the local tomography function is an algorithm for taking the measurements of the relative attenuation data and manipulating the measurements via the algorithm for determining the location of the discontinuity.

Along with the acceptance of CT into the mainstream of the medical and other fields as well, has emerged the health concern about the radiation dosage it imposes onto the human body and the potential harmful effects of that exposure. Two opposing factors immediately come into play with the use of CT: (1) high resolution and improved detailed imaging is obtainable with CT that has not been achieved before. However, (2) to achieve these desired results that help immensely in making a proper diagnosis and evaluation, a larger dose of radiation is focused onto the subject with CT technology that is used in other types of imaging methods, such as conventional X-ray negative imprints. The main problem with CT, therefore, has been the potential danger it represents due to excessive radiation exposure, and the technology has been grappling with the delimina of how to maintain the superior diagnosis output of CT while keeping the radiation exposure in control to ensure its safety to the patient, or its user in any non-medical application.

Conventional tomography is a global procedure in that the standard convolution formulas for reconstruction of the density at a single point require the line integral data over all lines within some planar cross-section containing the point. A desirable goal has been to reduce radiation exposure for safety purposes while maintaining high quality image output, although this has heretofore not been achieved to a satisfactory level. While developments in CT imaging have made marked improvements in its technological capabilities, the problem as to the radiation effects has not received the same degree of attention and has remained an unsolved concern in the use of computer tomography.

SUMMARY OF THE INVENTION

The present invention describes a new method of obtaining the same high level of resolution currently available with CT while reducing the amount of radiation exposure to the subject in performing the CT. Additionally as a corollary, this disclosed method allows for obtaining greatly improved CT resolution of the subject by using the same amount of radiation now used with conventional CT that gives a lower degree of resolution in its output image. The described method accomplishes this by use of an algorithm developed that reconstructs the wavelet coefficients of an image form the Radon transform data. The properties of wavelets are used to localize the Radon transform, and these wavelet properties are used to reconstruct a local region of the cross section of a body, using almost completely local data which significantly reduces the amount of exposure and computations in X-ray tomography. The algorithm of the invention is distinguished from previous algorithms in that it is based on the observation that for some wavelet bases with sufficiently many vanishing moments, the ramp-filtered version of the scaling function, as well as the wavelet function, has extremely rapid decay. The variance of the elements of the null-space is negligible in the locally reconstructed image. An upper bound for the reconstruction error in terms of the amount of data used in the algorithm is also determined by the algorithm, which, for example, requires 22% of full exposure data to reconstruct a local region 16 pixels in radius in a 256×256 image.

The algorithm of the invention allows computation of the actual value of the density to a very high accuracy up to a single additive constant depending on the image. The actual densities up to this additive constant, not just estimates of jumps in relative densities, can be obtained with the algorithm of this invention, which gives more accurate information for diagnostic purposes.

The general method of this invention can be used as the entire method of a given CT system, or it can be incorporated as part of an existing CT control system as a front end software control program.

In accordance with the present invention, apparatus and method are, therefore, provided for obtaining the wavelet transform from the tomographic data. The value in this new disclosure is that in scanning a subject to construct its CT image, one can go straight to the wavelet transform without the step of reconstructing the image first. The described algorithm can be applied to full data, to limited angle data, or to local data, for obtaining the wavelet transform. With the thus obtained wavelet transform, local image reconstruction is achieved with superior definition, in a shorter time, and from the use of less radiation on the subject or patient.

Accordingly, it is an object of the present invention to reconstruct with high accuracy and with few computations the wavelet transform of an image directly from the tomographic measurements of said image.

It is a further object of the invention to compute to high accuracy a small region of said image from measurements on line passing only through the region, thereby reducing computation time and radiation exposure.

It is a still further object of the present invention to reconstruct the density at a point using only line integral data on lines that pas through a small region containing that point, thereby achieving reduced radiation exposure.

According to the first aspect of the invention, an apparatus is disclosed for synthesizing the data to produce an output image with less radiation than previously known.

According to a second aspect of the present invention, a method of processing data from a tomographic imaging system is provided comprising steps that include obtaining tomographic data from a CT scanner; processing of the data to obtain the sampled parallel beam data; computing the modified wavelet and scaling filters; and filtering of the preprocessed data to obtain wavelet coefficients of the original image.

BRIEF DESCRIPTION OF THE DRAWINGS

The accompanying drawings, which are incorporated in and form a part of the specification, illustrate the embodiment of the present invention and, together with the description, serve to explain the principles of the invention. In the drawings:

FIG. 3 is a data table showing the spread of wavelet and scaling functions;

in FIG. 10(b), the projection filtered by the conventional ramp filter; in FIG. 10(c), the projection when non-local data is set to zero; in FIG. 10(d), the filtered projection; in FIG. 10(e), the projection extrapolated outside the region of interest; and in FIG. 10(f), the filtered projection. In all the graphs of FIG. 10, the marked area is the region of exposure.

DETAILED DESCRIPTION OF THE PREFERRED EMBODIMENTS

Figures 1A, 1B:
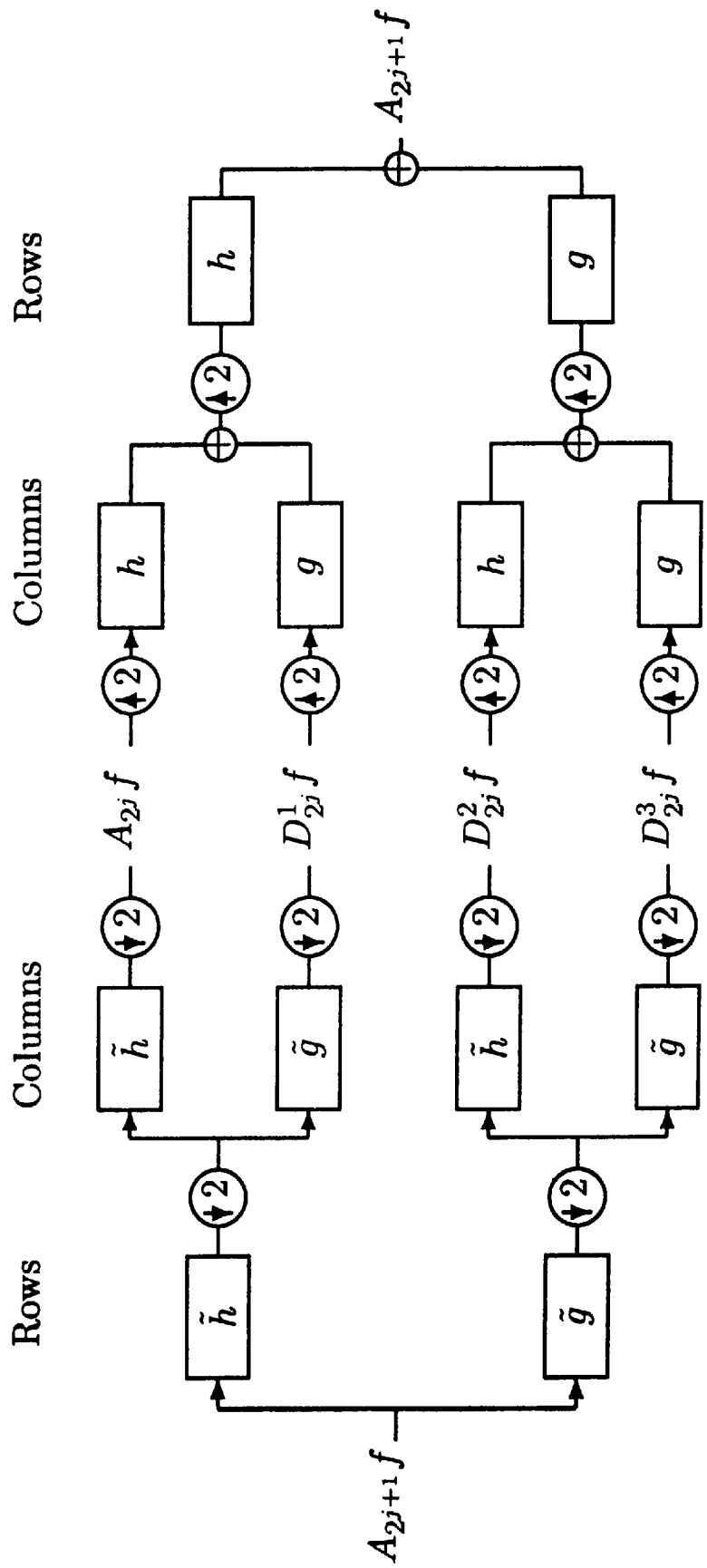
FIG. 1(a) and 1(b) are block diagram representations of wavelet filter banks, with FIG. 1(a) being a wavelet analysis filter bank, and FIG. 1(b) being a wavelet synthesis filter bank.

The theoretical basis of the invention will first be explained with reference to FIG. 1 and mathematical theories of image reconstruction as known in the art.

I. Introduction

In Computerized Tomography (CT), a cross section of the human body is scanned by a non-diffracting thin X-ray beam whose intensity loss is recorded by a set of detectors. The Radon Transform (RT) is a mathematical tool which is used to describe the recorded intensity losses as averages of the tissue density function over hyper-planes which, in dimension two, are lines.

It is well known that in dimension two and in fact in any even dimension the Radon transform is not local, that is, the recovery of an image at any fixed point requires the knowledge of all projections of the image. Applying this to the use of computer tomography (CT) in medial diagnosis means that a patient would have to be exposed to a relatively large amount of X-rays even if it was desired to view only a small part of the patient's body. Thus, searching for a means to reduce exposure, and at the same time to be able to perfectly reconstruct the region of interest, has been of great interest in recent years. See for example, J. DeStefano and T. Olson, "Wavelet localization of the Radon transform," *IEEE Trans. Signal Proc.,* vol. 42, no. 8, August 1994.

The application of wavelet theory to the inversion of the Radon transforms is known, being fist proposed in 1991–1992. See M. Holschneider, "Inverse Radon transforms through inverse wavelet transforms," in *Inverse Problems,* Vol. 7, 1991, pp. 853–861, and G. Kaiser and Streater, "Windowed Radon transforms," in *Wavelets: A Tutorial in Theory and Applications,* C. K. Chui, ed., Academic Press, New York, 1992, pp.399–441. An inversion formula based on the continuous wavelet transform was also proposed around the same time by one of the present inventors. See C. Walnut, "Application of Gabor and wavelet expansions to the Radon transform," in *Probabilistic and Stochastic Methods in Analysis, with Applications,* J. Byrnes, et al. eds., Kluwer Academic Publishers, Inc., 187–205, 1992. This formula was based on an intertwining between the one-dimensional continuous wavelet transform of the projection data at each angle and the two-dimensional wavelet transform of the original image. The fundamental observation was that the admissibility or vanishing moment condition that is characteristic of a wavelet is preserved under the Hilbert transform. Moreover two years later, it was noted that the Hilbert transform of a function with many vanishing moments should decay very rapidly. See C. Berenstein and D. Walnut, "Local inversion of the Radon transform in even dimensions using wavelets," in *75 Years of Radon Transform,* S. Gindikin, and P. Michor, eds., International Press Co., Ltd., 38–58, 1994, and J. DeStefano and T. Olson, "Wavelet localization of the Radon transform," *IEEE Trans. Signal Proc.,* vol. 42, no. 8, August 1994. This is related to the notion that certain singular integral operators are almost diagonalized by wavelets, an observation discussed a few years earlier. See G. Beylkin, R. Coifman, and V. Rokhlin, "Fast wavelet transforms and numerical algorithms," *Comm. Pure Appl. Math.,* vol. 44, 141–183, 1991. Berenstein and Walnut used the intertwining formula described in the cited "Application of Gabor and wavelet expansions to the Radon transform" article for local recovery, and explicit error estimates on the recovered image within the region of interest were obtained. See "Local inversion of the Radon transform in even dimensions using wavelets," cited above. In so doing, the authors noted that high frequency features of an image can be recovered locally using the wavelet transform.

The development of two algorithms applied to wavelets resulted from the above works.

(1) The first numerical algorithm using wavelets for local reconstruction was implemented in 1994. See "Wavelet localization of the Radon transform," as cited. This algorithm reconstructs the local values of a function $f$ directly from the one-dimensional wavelet transform of $R_\theta f$ at each angle $\theta$.

(2) That same year, the two-dimensional separable wavelet transform of a function was computed directly from the projection data as a means to do local recovery from local measurements. See A. H. Delaney and Y. Bresler, "Multiresolution tomographic reconstruction using wavelets," *IEEE Intern. Conf. Image Proc.,* vol. ICIP-94, pp. 830–834, November 1994. both algorithms take advantage of the observation that the Hilbert transform of a function with many vanishing moments has rapid decay; and both algorithms recover the high-resolution parts of the image locally (that is, by exposing the region of interest plus a small extra margin) and obtain the low-resolution parts by global measurements at a few angles. In this sense, these algorithms cannot accurately be described as local tomography algorithms. Both of these algorithms exhibit similar savings in exposure and similar quality of the reconstructed image in the region of interest. Recently, Olson in T. Olson, "Optimal time-frequency projections for localized tomography", *Annals of Biomedial Engineering,* vol. 23, pp. 622–636, September 1995, has improved his algorithm so as to reduce exposure still further by replacing the usual wavelet transform with a local trigonometric transform described in 1991. See R. R. Coifman, and Y. Meyer, "Remarques sur'l analyse de Fourier 'a feneétre," *série I. C. R. Acad. Sci. Paris* , 312:259–261, 1991.

By this disclosure, a wavelet-based algorithm is implemented to reconstruct a good approximation of the low-resolution parts of the image as well as the high-resolution parts using only local measurements. The algorithm of the invention is based on the observation that in some cases, the Hilbert transform of a compactly supported scaling function also has essentially the same support as the scaling function itself. This phenomena is related to the number of vanishing moments of the scaling function of an orthonormal or biorthonormal wavelet basis. That is, if $\phi(t)$ is such a scaling function, and if $\phi^{(j)}(0)=0$ for $j=1, 2, \ldots, K$, for some large K, then the Hilbert transform of $\phi$ will have rapid decay. This gives substantial savings in exposure and computation compared to the methods described by DeStefano and Olson, and by Delaney and Bresler, both cited above, and somewhat greater exposure (though still fewer computations) than the algorithm described by Olson.

The algorithm of the present disclosure reconstructs a region of radius 16 pixels in a 256×256 image to within 1% average error using 22% of the data, and to within 1% maximum error using 30% of the data. This improvement is significant, since the cited works of DeStefano and Olson, and of Delaney and Bresler, require a higher exposure of 40% of the data for the same size region and 1% maximum error. The method in Olson's independent cited work uses 20% for the same case, and since Olson's algorithm is not truly local, the algorithm and its application as described herein is valuable even if the exposure is somewhat higher.

Figure 7:
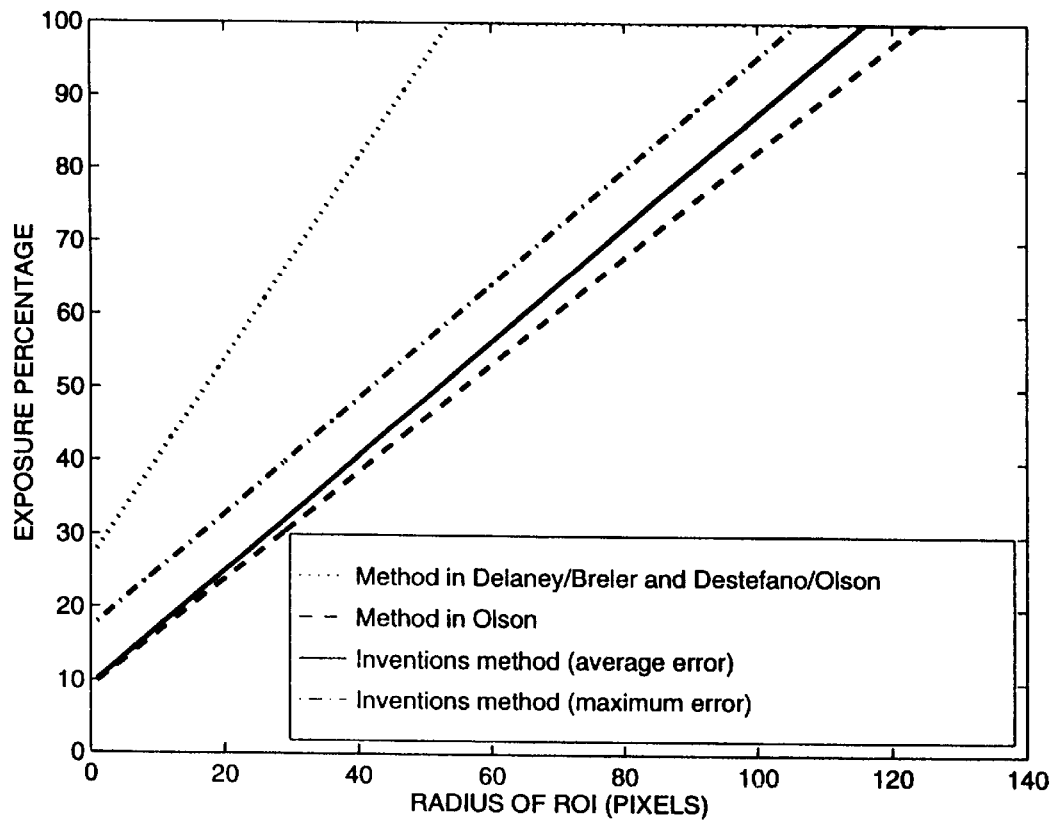
FIG. 7 is a graph showing the relationship between exposure percentage versus the size of the region of interest.

The goal of the algorithm described is to reconstruct the function locally from local measurements up to the nullspace of the interior Radon transform. That is, the problem of recovery of local values of a function from local projections only is not uniquely solvable. In F. Natterer, *The Mathematics of Computerized Tomography,* New York, Wiley, 1986, an example is given of functions that are nonzero on a disk but whose projections on all lines intersecting that disk are zero (FIG. 7). Such a function is said to be an element of the nullspace of the interior Radon transform. Any algorithm that uses only local measurements cannot reconstruct these nullspace elements. The advantage is that taking only local measurements is much easier to implement in hardware. Natterer's work showed that the elements of the null-space of the interior Radon transform do not vary much in the region of interest. In the algorithm of this invention, this phenomenon appears as a constant bias in the reconstructed image. Such a bias is commonly observed in the local reconstruction problem. See Natterer, ibid.; also A. K. Louis and A. Rieder, "Incomplete data problem in x-ray computerized tomography," *Numeriche Mathematik,* vol. 56, 1989.

The algorithms described in the cited works of DeStefano/ Olson, Delaney/Bresler, and Olson, are not true local tomography algorithms in that they use measurements far from the region of interest to recovery the function exactly on the region of interest. To the contrary, the algorithm described in this disclosure is more closely related to the technique of Λ-tomography, which is used to reconstruct the function $\Lambda f - \mu \Lambda^{-1} f$ rather than the density function $f$. See A. Faridani, F. Keinert, F. Natterer, E. L. Ritman and K. T. Smith, "Local and global tomography", in *Signal Processing,* IMA vol. Math., Appl., vol 23. New York: Springer-Verlag, New York, pp. 241–255, 1990, and A. Faridani, E. Ritman and K. T. Smith, "Local tomography", *SIAM J. Appl. Math.,* vol. 52, no. 2, pp. 459–484, April 1992, "Examples of local tomography," *SIAM J. Appl. Math.,* vol 52, no. 4, pp 1193–1198, 1992. The function $\Lambda f$ has the same singularities as $f$ and is cupped where $f$ is constant. The addition of the cup correction factor $\mu \Lambda^{-1} f$ results in good qualitative reconstructions of $f$. See A. Faridani, D. Finch, E. L. Ritman and K. T. Smith, "Local tomography II," *SIAM J. Appl. Math,* to appear.

Figure 12:
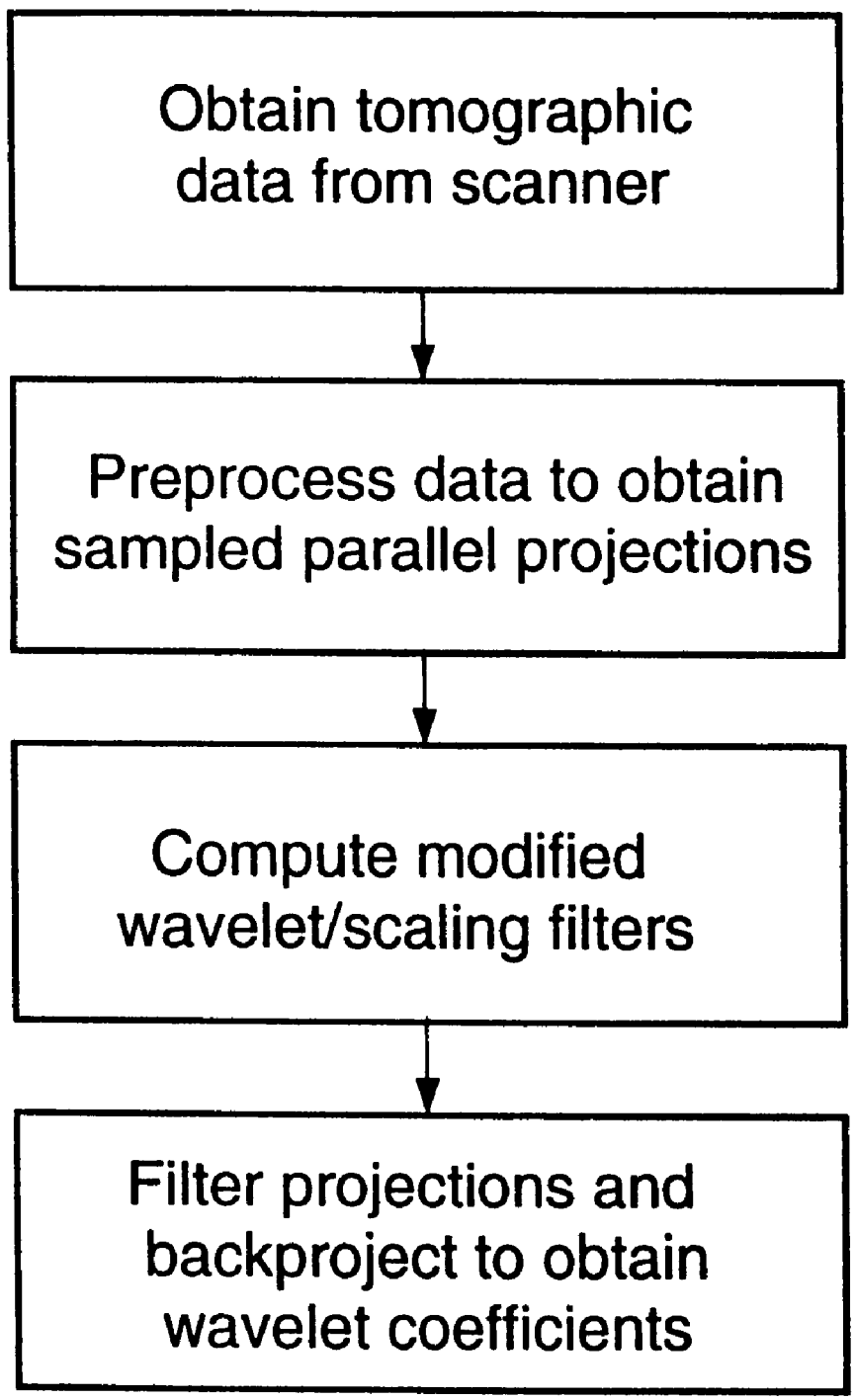
FIG. 12 is a flowchart diagram of the method disclosed herein for processing general tomographic data.

The algorithm of this invention is structured to reconstruct the wavelet and scaling coefficients of an image directly from its projections. This is of great benefit in applications where the wavelet coefficients of the reconstructed image are used, in that it saves the computations required to obtain the wavelet coefficients from the reconstructed image. The general application is shown by the steps listed in the flowchart at FIG. 12. This novel reconstruction technique leads to a local tomography algorithm which uses the projections of the image on lines intersecting the local region of interest plus a small number of projections, in the immediate vicinity, to obtain a very good approximation of the image in the region of interest.

In summary, the main features of the described algorithm are that it allows for:

- Reduced radiation exposure compared to most previous algorithms known in the art. With this algorithm, there is no need to obtain a rough estimate of the global properties of the Radon transform by sparsely sampled full exposure projections. Just a small number of projections are computed on lines passing close to the region of interest to reconstruct the local values of the image up to a constant bias. Moreover, the number of pixels in the margin is independent of the size of the region of interest and is also independent of the resolution of the measurements taken. Therefore, for the same region of interest, a high resolution CT scan would have a smaller region of exposure than a lower resolution scan.
- Computationally greater efficiency than other algorithms, because it uses fewer projections overall to locally reconstruct the image.
- Uniform exposure at all angles which allows for easier implementation in hardware. In prior art algorithms (such as those presented by DeStefano/Olson (1994), Delaney/Bresler, Destefano/Olson (1992), and Olson, all cited supra), different amount of projections have to be computed with variable lengths for different angles.
- Ability to reconstruct off-center or even multiple regions of interest, as well as centered reconstruction.
- Application to those cases where the wavelet basis is not separable and there exists no multiresolution approach to obtain the wavelet coefficients. For example, the method proposed in Delaney/Bresler can only be used for separable wavelet bases.
- Reconstruction of the wavelet coefficients of the image with the same complexity as the conventional filtered backprojection method.
- Effective reconstruction in both the parallel and fan-beam geometries. See F. Rashid-Farrokhi, K. J. R. Liu, and C. A. Berenstein, "Local Tomography in Fan-beam Geometry Using Wavelets," Proc. IEEE Int'l Conf. on Image Processing (ICIP-96), pp. II-709–712, 1996.

The description that follows briefly introduces, in section II, the Radon transform, and discusses the non-locality of the Radon transform and the conventional reconstruction technique, i.e., the filtered backprojection method. Beginning in section D after reviewing the basics of the wavelet transform, a full-data reconstruction technique is described based on the wavelet transform. In section B, the locality property of the proposed algorithm is described. Section E then details the implementation of this method and in section H the simulation results are presented.

II. The Conventional Reconstruction Technique

The following notations are used in this disclosure: The d dimensional Euclidean space is denoted by $R^d$. Given a set $S \subset R^d$, $1_S$ denotes the indicator function of S. The Fourier transform in $R^d$ is defined by $$\hat{f}(\vec{\omega}) = \int_{R^d} f(\vec{x}) e^{j2\pi \vec{\omega} \cdot \vec{x}} d\vec{x}.$$

The inverse Fourier transform is defined by $$f(\vec{x}) = (\hat{f})^{\vee}(\vec{x}) = \int_{R^d} \hat{f}(\vec{\omega}) e^{-j2\pi \vec{\omega} \cdot \vec{x}} d\vec{\omega}.$$

both continuous and discrete convolution operators are denoted by *.

A. Radon Transform

The conventional reconstruction technique is the filtered backprojection method, the theory of which starts with the Radon transform. Given $f(\vec{x})$, restricted to a disc of radius one, we define the Radon transform of $f$ by $$R_\theta f(s) = \int_{\vec{x} \cdot \vec{\theta} = s} f(\vec{x}) d\vec{x} = \int_{\theta^\perp} f(s\vec{\theta} + y) dy,$$

where $\vec{\theta} = (\cos \theta, \sin \theta)$, $\theta \in R$ and $\theta^\perp$ is the subspace perpendicular to $\vec{\theta}$.

The interior Radon transform such as discussed by P. Maass in "The interior Radon transform," *SIAM J. Appl. Math,* vol. 52, No. 3, pp. 710–724, June 1992, and also by Louis/Rieder, earlier cited, is the Radon transform restricted to lines passing through the region of interest (ROI) which is a circle of radius r (r<1) about the origin. It is defined by $$R_\theta f(s)$$

The problem of recovery of $f$ from the interior Radon transform is called the interior problem or region of interest tomography. The interior problem in dimension two is not uniquely solvable, i.e., there are functions which are not zero in the region of interest but whose projections on lines intersecting that region are zero. However, these functions do not vary much inside the region of interest, and in fact a crude approximation to the missing projections suffices to approximate $f$ well inside the region of interest up to an additive constant (as discussed in Natterer, previously cited).

B. Reconstruction

The basic formula for inverting the Radon transform is based on the fact that the Fourier transform of the Radon transform with respect to the variable s is the Fourier transform of the function $f$ along a line passing through the origin. This property is known as the projection theorem or Fourier slice theorem:

$$(\hat{R_\theta f})(\omega) = \hat{f}(\omega\vec{\theta}), \omega \in R.$$

Thus the Fourier transform of the projections at enough angles could in principle be assembled into a complete description of the two dimensional Fourier transform of the image and then simply inverted to arrive at the function $f$. Using the polar Fourier inversion formula and the Fourier slice theorem, we can reconstruct the function $f$ from the projection data $R_\theta f(s)$ by $$f(\vec{x}) = \int_0^\pi \int_{-\infty}^\infty (\hat{R_\theta f})(\omega)e^{j2\pi\omega(\vec{x}\cdot\vec{\theta})}|\omega|d\omega d\theta. \qquad (1)$$

The above formula, called the filtered backprojection formula, can be implemented in two steps, the filtering step, which in the Fourier domain can be written as $$\hat{Q}_\theta(\omega) = \hat{R_\theta f}(\omega)|\omega|, \qquad (2)$$

and the backprojection step, $$f(\vec{x}) = \int_0^\pi Q_\theta(\vec{x}\cdot\vec{\theta})d\theta. \qquad (3)$$

Because $|\omega|$ is not bounded and filtering by this filter tends to magnify the high frequency noise, it is expedient in practice to multiply this operator by a smoothing window $W(\omega)$ as $$\hat{Q}_\theta(\omega) = \hat{R_\theta f}(\omega)|\omega|W(\omega). \qquad (4)$$

Therefore the reconstruction will result in an approximation of $f$ rather than $f$ itself. Normally the approximation has the form $e*f$, where $e$ is an approximate delta function, called the point spread function (described by K. T. Smith and F. Keinert, "Mathematical foundation of computed tomography," *Applied Optics,* vol. 24, No. 23, December 1985). The point spread function $e$ is related to $W(\omega)$ by $$W(\omega) = \hat{e}(\omega\cos\theta, \omega\sin\theta).$$

C. Non-locality of RT Inversion

In (2) the Radon transform data is filtered by $|\omega|$. This operation can be formulated in the space domain as $$Q_\theta(t) = H\partial R_\theta f(t),$$

where H is the Hilbert transform on R, and $\partial$ is ordinary differentiation. In the above equation the derivative part is a local operator, but the Hilbert transform $$(\hat{H}g)(\omega) = i\text{sign}(\omega)\hat{g}(\omega) \qquad (5)$$

introduces a discontinuity in the derivative of the Fourier transform of a function at the origin. Hence the Hilbert transform of a compactly supported function can never be compactly supported. This means that RT inversion based on (1) can not be accomplished locally, that is, in order to recover $f$ exactly at a point $\vec{x}$, all projections of $f$ are required and not just those on lines passing near $\vec{x}$. It has been noted that the above mentioned filtering will not increase the essential support of a function if the function's Fourier transform vanishes to high order at the origin (explained in Berenstein/Walnut and in DeStefano/Olson, both as cited). Wavelets which are in general constructed with as many zero moments as possible are good candidates for these functions.

D. Continuous Wavelet Transform

The wavelet transform has been an increasingly popular tool for signal and image processing. The transform decomposes the signal onto shifts and dilate of a function called the mother wavelet. In two dimensions, the wavelet transform is defined as follows. Let $g(\vec{t})$, $\vec{t} \in R^2$ satisfy $$0 < \inf_{\theta\in(0,2\pi)}\int_0^\infty r^{-1}|\hat{g}(r\cos\theta, r\sin\theta)|^2 dr < \qquad (6)$$

$$\sup_{\theta\in[0,2\pi)}\int_0^\infty r^{-1}|\hat{g}(r\cos\theta, r\sin\theta)|^2 dr < \infty.$$

let $\vec{g}(\vec{t})' g(-\vec{t})$, $\vec{t} \in R^2$, and define the continuous wavelet transform of $f$, on $R^2$, by $$W_u^{(2)}(g;f)(\vec{v}) = \int_{R^2}f(\vec{t})u g(u\vec{t}-\vec{v})d\vec{t} = f*\hat{g}_u(u^{-1}\vec{v}), \qquad (7)$$

where $\mu \in R\setminus\{0\}$ and $\vec{v}=[x\ y]\in R^2$, and $g_\mu(\vec{v})=\mu g(\mu\vec{v})$. In order to reconstruct the function $f$ from its wavelet transform, we use $$f(\vec{t}) = \int_{R^2}\int_R u^4 W_u^{(2)}(g;f)(\vec{v})u g(u\vec{t}-\vec{v})du d\vec{v}.$$

E. Multi-Resolution Wavelet Representation

In practice one prefers to write $f$ as a discrete superposition of wavelets, therefore the discrete wavelet transform is defined by $$W_{2^j}^{(2)}(g;f)(\vec{n}) = \int_{R^2}f(\vec{t})g_{2^j}(\vec{t}-2^{-j}\vec{n})d\vec{t},$$

which is derived from (7) by setting $\mu=^j$ and $\vec{v}=\vec{n}$, where $j\in Z$ and $\vec{n}\in Z^2$.

Below a multiresolution analysis approach is described to recover $f(\vec{x})$ from its discrete wavelet transform (precise definitions and further details on which can be found in S. Mallat, "A theory for multiresolution signal decomposition: The wavelet representation," *IEEE Trans. on PAMI,* vol. 11, no. 7, July 1989). Let $A_{2^j}$ be the operator which approximates a measurable function $f(\vec{x})$ with finite energy ($f(\vec{x})\in L^2(R^2)$) at resolution $2^j$. We consider the vector space $V_{2^j}\subset L^2(R^2)$ as the set of all possible approximations at the resolution of $2^j$ of functions in $L^2(R^2)$, such that $\forall j\in Z$, $V_{2^j}\subset V_{2^{j+1}}$. For each multiresolution approximation $V_{2^j}$, there exists a unique function $\phi(x)\in L^2(R)$, called a scaling function. Let $h(n)=[\phi_{2^{-1}}(\mu), \phi(\mu-n)]$, the Fourier transform of $h(n)$, denoted by $H(\omega)$, is defined as $$H(\omega) = \sum_{n=-\infty}^{\infty} h(n)e^{-jn\omega}.$$

The Fourier transform of $\phi(x)$ is given by $$\hat{\phi}(\omega) = \prod_{p=1}^{\infty} H(2^{-p}\omega),$$

and $$\hat{\phi}_{2^j}(\omega) = \hat{\phi}(\omega)\prod_{p=1}^{j} H(2^{1-p}\omega).$$

Define the function $\psi(x)$, the mother wavelet, by $\psi(\omega)=G(\omega/2)\phi(\omega/2)$, where $G(\omega)=e^{-j\omega}\overline{H(\omega+\pi)}$. It can then be shown that $$\hat{\psi}_{2^j}(\omega) = \begin{cases} \hat{\phi}(\omega)G(2^{j-1}\omega)\prod_{p=1}^{j-1} H(2^{1-p}\omega) & \text{if } j > 1 \\ \hat{\phi}(\omega)G(\omega) & \text{if } j = 1 \end{cases}.$$

Letting $\Phi(x,y)=\phi(x)\phi(y)$, $$\{\Phi_{2^j}(x-2^{-j}n, y=2^{-j}m)\}_{(n,m)\in Z^2} \qquad (8)$$

forms an orthonormal basis for $V_{2^j}$, in a multiresolution approximation in $L^2(R^2)$, where $\Phi_{2^j}(x,y)=2^j\Phi(2^jx,2^jy)=\phi_{2^j}(x)\phi_{2^j}(y)=2^{j/2}\phi(2^jx)\cdot 2^{j/2}\phi(2^jx)$. The projection of $f$ onto $V_{2^j}$ can therefore be computed in this case by $$A_{2^j}f(x,y) = \sum_{n=-\infty}^{\infty}\sum_{m=-\infty}^{\infty} \langle f(u,v),$$

$$\phi_{2^j}(u-2^{-j}n)\phi_{2^j}(v-2^{-j}m)\rangle \phi_{2^j}(x-2^{-j}n)\phi_{2^j}(y-2^{-j}m).$$

The discrete approximation at resolution $2^j$ is defined by $$A^d_{2^j}f(n,m) = (f(u,v) * \phi_{2^j}(u)\phi_{2^j}(v))2^{-j}n, 2^{-j}m), \qquad (9)$$

where $(n,m)\in Z^2$ and $\tilde{\phi}_{2^j}(u)=\phi_{2^j}(-u)$. The different between the approximation $A_{2^j}f(x,y)$ and $A_{2^{j+1}}f(x,y)$, called the detail signal at resolution $2^j$, corresponds to the projection of $f$ on the orthogonal complement of $V_{2^j}$ in $V_{2^{j+1}}$, denoted by $O_{2^j}$. Let $$\psi^1(x,y)=\phi(x)\psi(y),\ \psi^2(x,y)=\psi(x)\phi(y),\ \psi^3(x,y)=\psi(x)\psi(y), \qquad (10)$$

then the set of functions $$\{\psi^1_{2^j}(x=2^{-j}n, y-2^{-j}m),\ \psi^2_{2^j}(x=2^{-j}n, y-2^{-j}m),\ \psi^3_{2^j}(x=2^{-j}n, y-2^{-j}m)\}_{(n,m)\in Z^2},$$

where $\psi^i_{2^j}(x,y)=2^j\psi^i(2^jx,2^jy)$ is an orthonormal basis for $O_{2^j}$. The projection of $f(x,y)$ on the vector space $O_{2^j}$ is given by $$D_{2^j,1}f(x,y) = \sum_{n=-\infty}^{\infty}\sum_{m=-\infty}^{\infty} \langle f(u,v),$$

$$\phi_{2^j}(u-2^{-j}n)\psi_{2^j}(v-2^{-j}m)\rangle \phi_{2^j}(x-2^{-j}n)\psi_{2^j}(y-2^{-j}m)$$

$$D_{2^j,2}f(x,y) = \sum_{n=-\infty}^{\infty}\sum_{m=-\infty}^{\infty} \langle f(u,v),\ \psi_{2^j}(u-2^{-j}n)\phi_{2^j}(v-2^{-j}m)\rangle \psi_{2^j}$$

$$(x-2^{-j}n)\phi_{2^j}(y-2^{-j}m)$$

$$D_{2^j,3}f(x,y) = \sum_{n=-\infty}^{\infty}\sum_{m=-\infty}^{\infty} \langle f(u,v),\ \psi_{2^j}(u-2^{-j}n)\psi_{2^j}(v-2^{-j}m)\rangle \psi_{2^j}$$

$$(x-2^{-j}n)\psi_{2^j}(y-2^{-j}m).$$

The detail coefficients are given by $$D^d_{2^j,1}f(n,m)=(f(x,y)*2^{-j}\tilde{\phi}_{2^j}(x)\tilde{\psi}_{2^j}(y))(2^{-j}n,2^{-j}m)$$

$$D^d_{2^j,2}f(n,m)=(f(x,y)*2^{-j}\tilde{\psi}_{2^j}(x)\tilde{\phi}_{2^j}(y))2^{-j}n,2^{-j}m)$$

$$D^d_{2^j,3}f(n,m)=(f(x,y)*2^{-j}\tilde{\psi}_{2^j}(x)\tilde{\psi}_{2^j}(y))2^{-j}n,2^{-j}m), \qquad (11)$$

where $(n,m)\in Z^2$ and $\tilde{\psi}_{2^j}(u)=\psi_{2^j}(-u)$. FIG. 1(a) shows the conventional filter bank which is usually used to obtain approximation and details of a signal.

The discrete approximation at resolution $2^{j+1}$ can be obtained by combining the detail and approximation at resolution $2^j$, i.e., $$A^d_{2^{j+1}}f(n,m) = 2\sum_{k=-\infty}^{\infty}\sum_{l=-\infty}^{\infty} h(n-2k)h(m-2l)A^d_{2^j}f(k,l) + \qquad (12)$$

$$2\sum_{k=-\infty}^{\infty}\sum_{l=-\infty}^{\infty} h(n-2k)g(m-2l)D^d_{2^j,1}f(k,l) +$$

$$2\sum_{k=-\infty}^{\infty}\sum_{l=-\infty}^{\infty} g(n-2k)h(m-2l)D^d_{2^j,2}f(k,l) +$$

$$2\sum_{k=-\infty}^{\infty}\sum_{l=-\infty}^{\infty} g(n-2k)g(m-2l)D^d_{2^j,3}f(k,l).$$

Therefore in order to recover the approximation at level $j+1$, the approximations at level $j$ are filtered by $h(m)h(n)$, and the detail coefficients are filtered by $h(n)g(m)$, $g(n)h(m)$, and $g(n)g(m)$ respectively. These wavelet reconstruction filters in the Fourier domain are given by $$H^A_r(\omega_1,\omega_2)=H(\omega_1)H(\omega_2)$$

$$H^{D_1}_r(\omega_1,\omega_2)=H(\omega_1)G(\omega_2)$$

$$H^{D_2}_r(\omega_1,\omega_2)=G(\omega_1)H(\omega_2)$$

$$H^{D_3}_r(\omega_1,\omega_2)=G(\omega_1)G(\omega_2). \qquad (13)$$

FIG. 1(b) shows the block diagram of the analysis filter bank which obtains the approximation at level $j$ from the approximations and detail at level $j-1$. This block diagram can be used in a pyramidal structure to reconstruct $A^d_1 f$, the approximation at resolution 1, from the set $(A^d_{2^j}f, D^d_{2^j}f)_{J\leq j\leq -1}$. In those applications that we are interested in, namely recovering a local region of the image from the approximate and detail coefficients, we have to calculate these coefficients for that region plus a margin for the support of the wavelet reconstruction filters. That margin is equal to half of the length of the filters $h$ and $g$.

III. The Present Invention

We now describe the algorithm of the invention which can be used to obtain the wavelet coefficients of a function on $R^2$ from its Radon transform data. In those applications for which one is interested in the wavelet coefficients of the function, use of this algorithm involves fewer computations than first reconstructing the function and then taking its wavelet transform. Also using this method one can obtain locally the wavelet coefficients of a function, which will allow the local reconstruction of a function and the algorithm's use in local tomography. This property will be explained in section B. We first introduce the main formulas for the reconstruction of the continuous wavelet transform directly from the Radon transform data.

A. Wavelet Reconstruction from the Projection Data

Given a real-valued, square integrable function g on $R^2$ which satisfies condition (6), let $f$ be given on $R^2$, and the wavelet transform of function $f$ can then be reconstructed from its 1-D projections by $$W_u^{(2)}(g;f)(\vec{v}) = f * \tilde{g}_u(u\vec{v}) \qquad (14)$$

$$= u^{1/2} \int_0^\pi (H\partial R_\theta \tilde{g}_u * R_\theta f)((u^{-1}x)\cos\theta + (u^{-1}y)\sin\theta)d\theta,$$

where $\vec{v} = [x\ y] \in R^2$. In the discrete case the above equation becomes:

$$W_{2^j}^{(2)}(g;f)(\vec{n}) = \int_0^\pi (H\partial R_\theta \tilde{g}_{2^j} * R_\theta f)((2^{-j}n_1)\cos\theta + (2^{-j}n_2)\sin\theta)d\theta, \qquad (15)$$

where $\vec{n} = [n_1\ n_2]$. The right-hand-side can be evaluated in two steps, the filtering step, $$Q_{2^j,\theta(t)} = (R\theta f * H\partial R_\theta \tilde{g}_{2^j})(2^{-j}t),$$

and the backprojection step, $$W_{2^j}^{(2)}(g;f)(\vec{n}) = \int_0^\pi Q_{2^j,\theta}(n_1\cos\theta + n_2\sin\theta)d\theta. \qquad (16)$$

The filtering step can be implemented in Fourier domain as $$\hat{Q}_{2^j,\theta}(\omega) = \hat{R_\theta f}(\omega)|\omega|\tilde{\tilde{g}}^{2^j}(\omega\cos\theta,\omega\sin\theta)W(\omega),$$

where $$\tilde{\tilde{g}}^{2^j}(\omega_1,\omega_2), \hat{Q}_{2^j,\theta}(\omega) \text{ and } \hat{R_\theta f}(\omega)$$

are the Fourier transforms of the functions $\tilde{g}_{2^j}$, $Q_{2^j,\theta}$ and $R_\theta f$, respectively, and $W(\omega)$ is a smoothing window. Therefore (15) can be implemented using the same algorithm as the conventional filtered backprojection method while the ramp filter $|\omega|$ is replaced by the wavelet ramp filter $|\omega|+\acute{e},\widehat{otl}g+ee\ _{2^j}(\omega\cos\theta, \omega\sin\theta)$.

If the wavelet basis is separable, the approximation and detail coefficients are given by (9) and (11). These coefficients can be obtained from the projection data by (15), replacing $g(\vec{v})$ by $\psi(x,y)=\phi(x)\phi(x)$, $\psi^1(x,y)=\phi(x)+e,sez\ v+ee\ (x)$, $\psi^2(x,y)=+e,sez\ v+ee\ (x)\phi(x)$, and $\psi^3(x,y)=+e,sez\ v+ee\ (x)+e,sez\ v+ee\ (x)$, respectively. For example, the approximation coefficients are obtained by $$A_{2^j}^d f(n,m) = W_{2^j}^{(2)}(\Phi;f)([n,m]) = \qquad (17)$$

$$2^{j/2} \int_0^\pi (H\partial R_\theta \tilde{\Phi}_{2^j} * R_\theta f)((2^{-j}n)\cos\theta + (2^{-j}m)\sin\theta)d\theta.$$

These coefficients can be calculated using the standard filtered backprojection method, while the filtering part in the Fourier domain is given by $$\hat{Q}_{A^d_{2^j,\theta}}(\omega) = \hat{R_\theta f}(\omega)|\omega|+\acute{e},\widehat{otl}\psi+ee\ _{2^j}(\omega\cos\theta, \omega\sin\theta)W(\omega),$$

where $+\acute{e},\widehat{otl}\psi+ee\ _{2^j}(\omega\cos\theta,\omega\sin\theta) = +\acute{e},\widehat{otl}\phi+ee\ _{2^j}(\omega\cos\theta) +\acute{e},\widehat{otl}\phi+ee\ _{2^j}(\omega\sin\theta)$. The detail coefficients can be found in a similar way as $$D^d_{2^j,i}f = W^{(2)}_{2^j}(\psi^i;f)([n\ m]) \text{ for } i=1,2,3. \qquad (18)$$

To get the detail coefficients, the filtering step is modified as $$\hat{Q}_{D^d_{2^j,i,\theta}}(\omega) = \hat{R_\theta f}(\omega)|\omega|+\acute{e},\widehat{otl}\psi+ee\ ^i_{2^j}(\omega\cos\theta,\omega\sin\theta)W(\omega) \text{ for } i=1,2,3.$$

Figure 2:
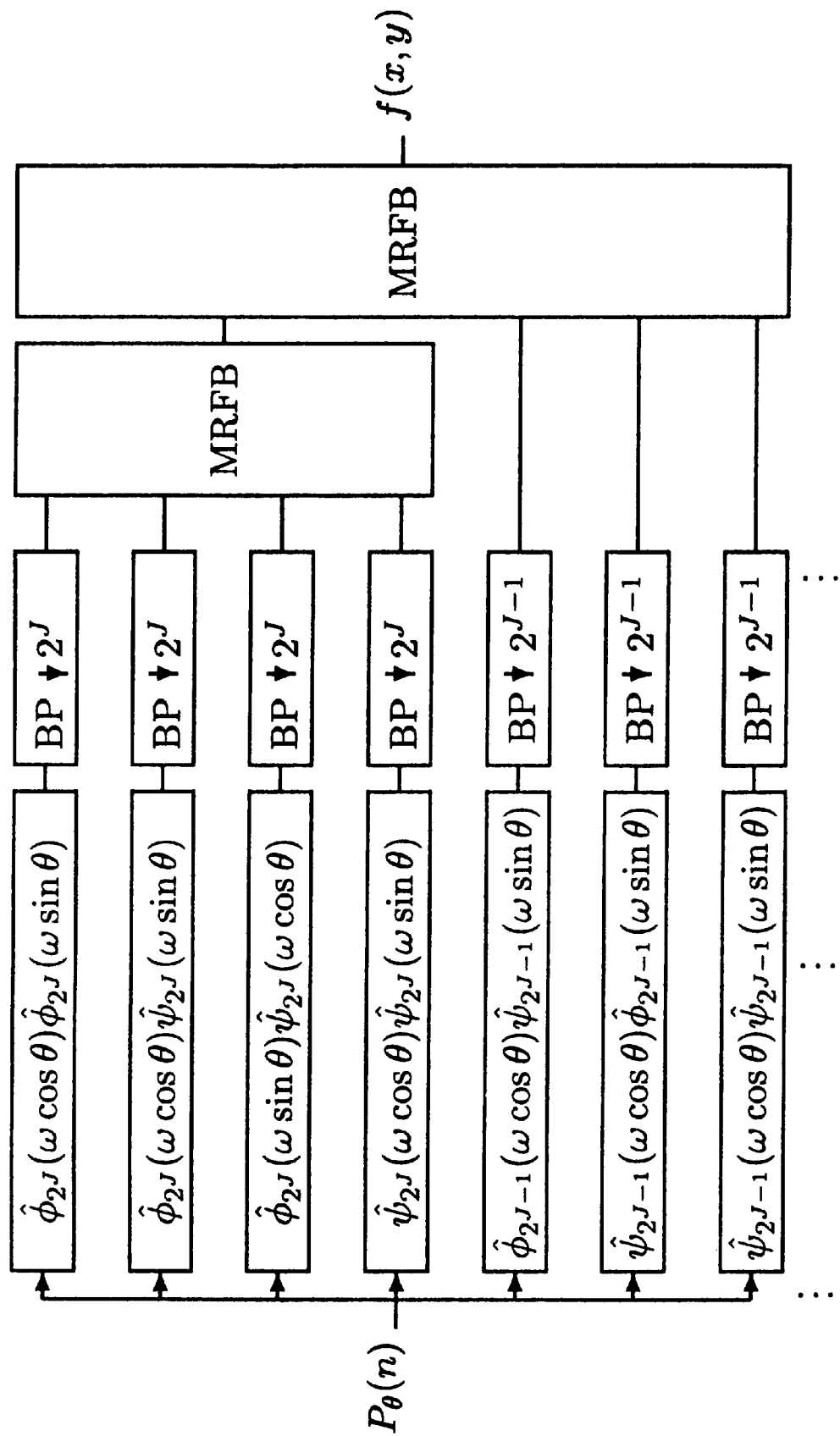
FIG. 2 is a block diagram representation of a wavelet reconstruction from the projection data, where the multiresolution reconstruction filter bank (MRFB) is the wavelet synthesis filter bank of FIG. 1(b)
Figure 4A:
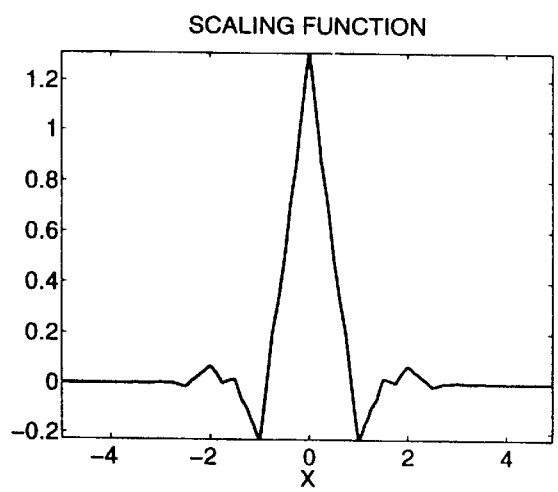
FIGS. 4(a)–(d) are plots showing characteristics of a wavelet, with FIGS. 4(a) and 4(b) being characteristics of this wavelet's scaling function and mother wavelet, respectively, and FIGS. 4(c) and 4(d) being characteristics of its rampled scaling function and ramped mother wavelet, respectively.
Figure 4B:
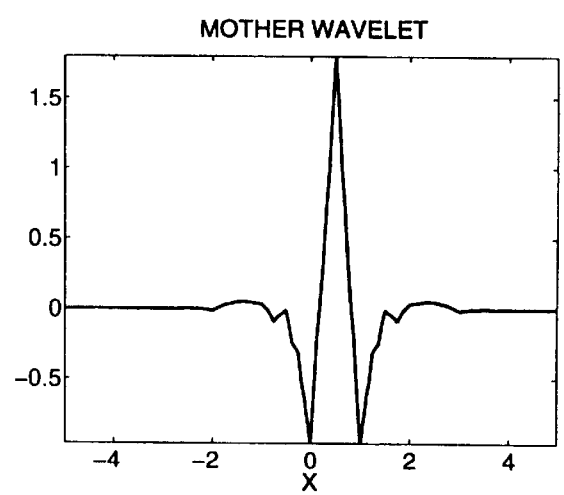
Figure 4C:
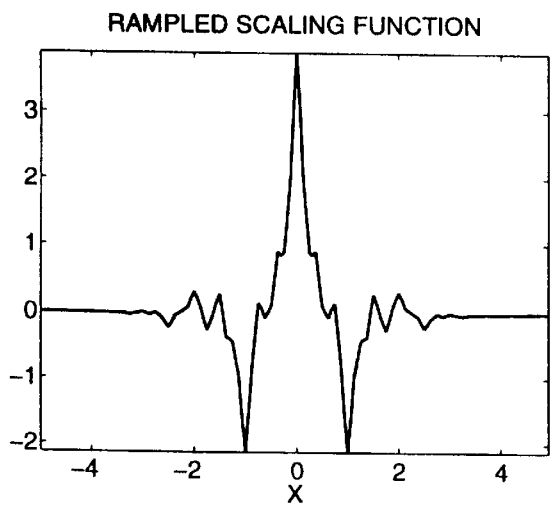
Figure 4D:
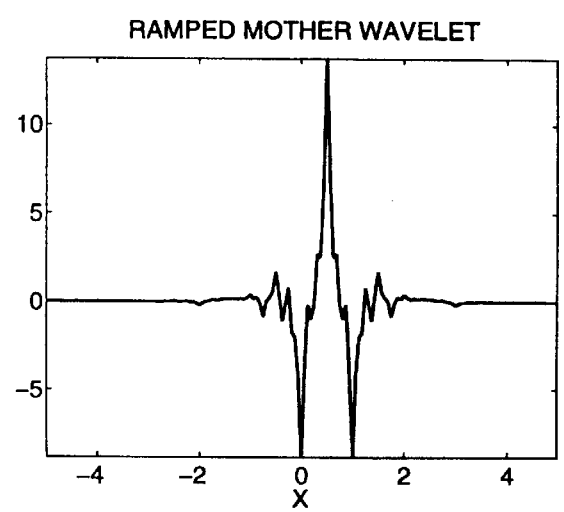

This means that the wavelet and scaling coefficients of the image can be obtained by the filtered backprojection method while the ramp filter is replaced by $$H^A_\theta=|\psi|+\acute{e},\widehat{otl}\Phi+ee\ ^1_{2^j}(\omega\cos\theta,\omega\sin\theta)=|\omega|+\acute{e},\widehat{otl}\phi+ee\ _{2^j}(\omega\cos\theta) +\acute{e},\widehat{otl}\phi+ee\ _{2^j}(\omega\sin\theta)$$

$$H^{D_1}_\theta=|\omega|+\acute{e},\widehat{otl}\psi+ee\ ^1_{2^j}(\omega\cos\theta,\omega\sin\theta)=|\omega|+\acute{e},\widehat{otl}\phi+ee\ _{2^j}(\omega\cos\theta(+\acute{e},\widehat{otl}+\acute{e},\widetilde{sez}v+ee\ +ee\ _{2^j}(\omega\sin\theta)$$

$$H^{D_1}_\theta=|\omega|+\acute{e},\widehat{otl}\psi+ee\ ^2_{2^j}(\omega\cos\theta,\omega\sin\theta)=|\omega|+\acute{e},\widehat{otl}+\acute{e},\widetilde{sez}v+ee\ +ee\ _{2^j}(\omega\cos\theta)+\acute{e},\widehat{otl}+\acute{e},\widetilde{sez}v+ee\ +ee\ _{2^j}(\omega\sin\theta)$$

$$H^{D_1}_\theta=|\omega|+\acute{e},\widehat{otl}\psi+ee\ ^3_{2^j}(\omega\cos\theta,\omega\sin\theta)=|\omega|+\acute{e},\widehat{otl}+\acute{e},\widetilde{sez}v+ee\ +ee\ _{2^j}(\omega\cos\theta)+\acute{e},\widehat{otl}+\acute{e},\widetilde{sez}v+ee\ +ee\ _{2^j}(\omega\sin\theta), \qquad (19)$$

which are called the scaling and wavelet ramp filters. In order to obtain pyramidal wavelet coefficients, the $A^d_{2^j}f$ and $D^d_{2^j,i}f$, $i=1,2,3$, $-J \leq j \leq -1$ are found using (18) and (17). To reconstruct the image from these coefficients, we use the multiresolution reconstruction formulas (12). FIG. 2 shows the block diagram of the multiresolution reconstruction system. The reconstruction part uses the conventional multiresolution reconstructionfilter bank (cf. FIG. 1) which appear as black boxes in the block diagram.

B. Local Reconstruction

It has been noted (be Berenstein/Walnut and DeStefano/Olson, as previously cited) that if a function has a large number of vanishing moments (or, equivalently, if its Fourier transform vanishes to high order at the origin), then its Hilbert transform will decay very rapidly at infinity. If a compactly supported function has this property, then the essential support of its Hilbert transform (5) should not be large. This phenomenon is in part a manifestation of the observation made by Beylkin/Coifman/Rokhlin, supra, that an integral operator with singular kernel of Calderon-Zygmund type is almost diagonalized in a wavelet basis.

More specifically, the following holds:

Lemma 1: Suppose that $f(t)=0$ outside the interval $[-A,A]$ and satisfies $\int t^n f(t)dt=0$ for $n=0,1,\ldots,N$. Then for $|s|>A$, $$|Hf(s)| \le \frac{1}{\pi|s-A|^{N+2}} \int_{-A}^{A} |f(t)t^{N+1}| dt.$$

Proof: Assume that s>A. The argument for s<−A is the same. Since $$Hf(s) = \lim_{\epsilon \to 0} \frac{1}{\pi} \int_{|t|>\epsilon} \frac{f(s-t)}{t} dt,$$

since $f(t)=0$ outside $[-A,A]$, and since s>A, $$Hf(s) = \frac{1}{\pi} \int_{s-A}^{s+A} \frac{f(s-t)}{t} dt.$$

Fixing s, and expanding $1/t$ in a Taylor series about t=s gives for some $th_s \in [s-A, s+A]$, $$Hf(s) = \frac{1}{\pi} \int_{s-A}^{s+A} f(s-t) \left[ \sum_{k=0}^{N} \frac{(s-t)^k}{s^{k+1}} + \frac{(s-t)^{N+1}}{t_s^{N+2}} \right] dt$$

$$= \frac{1}{\pi} \sum_{k=0}^{N} \frac{1}{s^{k+1}} \int_{-A}^{A} f(t)t^k dt + \frac{1}{2\pi i} \int_{s-A}^{s+A} t_s^{-N-2} f(s-t)(s-t)^{N+1} dt$$

$$= \frac{1}{\pi} \int_{s-A}^{s+A} t_s^{-N-2} f(s-t)(s-t)^{N+1} dt$$

Since $t_s \in [s-A, s+A]$, $|t_s|^{-N-2} \le |s-A|^{-N-2}$, so that $$|Hf(s)| \le \frac{1}{\pi|s-A|^{N+2}} \int_{-A}^{A} |f(t)t^{N+1}| dt,$$

thereby completing the proof.

The significance of this observation for local tomography is the following. If +e,sez v+ee (t) is the wavelet corresponding to the scaling function φ(t) for a Multiresolution Analysis, then at least the zeroth moment of +e,sez v+ee must vanish. It is possible to design wavelets which have compact support and which have many vanishing moments. In this case, the functions $H\partial R_\theta \psi^i(t)$, where $\psi^i$, i=1, 2, 3, are given by (10), and will have very rapid decay for each θ. Numerically, even for wavelets with a few vanishing moments, the essential support of $H\partial R_\theta \psi^8(t)$ is the same as the support of $R_\theta \psi^i(t)$ for each θ. This means that by (14), the discrete wavelet coefficients (18) can be computed locally using essentially local projections.

Rapid decay after ramp filtering is also observed in scaling functions φ(t) provided that φ has vanishing moments. Specifically, if φ(t) satisfies $\int \phi(t)dt=1$ and $\int t^j \phi(t) dt=0$ for j=1, 2, . . . , N, then ∂φ satisfies $\int \phi(t)dt=0$, $\int t\phi(t)dt=1$, and $\int t^j \phi(t)dt=0$ for j=2, 3, . . . , N+1. Therefore as in Lemma 1, it follows that $$|H\partial\varphi(s)| \le \frac{1}{\pi s^2} + \frac{1}{\pi|s-A|^{N+3}} \int |\partial\varphi(t)t^{N+2}| dt.$$

Even though the decay is dominated by the $s^{-2}$ term, ramp-filtered scaling functions with vanishing moments display significantly less relative energy leakage outside the support of the scaling function than those without vanishing moments.

In order to quantify this locality phenomenon, we define the spread of a function $f$ with respect to an interval I under ramp-filtering to be the normalized energy of the function $(|\omega|\hat{f}(\omega))^V(t)$ outside I, i.e., with $\bar{I}$ denoting the complement of I, $$\text{spread}(f; I) = \left( \int_{\bar{I}} |(|\omega|\hat{f}(\omega))^V(t)|^2 dt \right)^{1/2} \bigg/ \left( \int_{-\infty}^{\infty} |(|\omega|\hat{f}(\omega))^V(t)|^2 dt \right)^{1/2}.$$

Figure 6A:
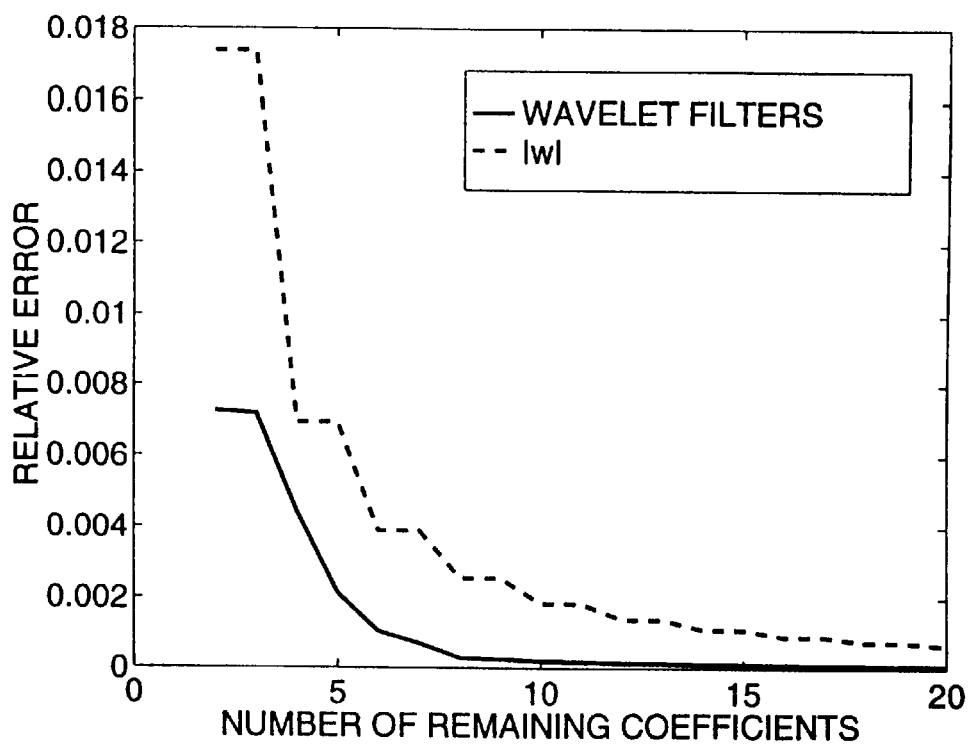
FIGS. 6(a) and (b) are graphs that present the normalized error (23) versus the number of remaining coefficients, with FIG. 6(a) being that of a biorthogonal wavelet with less dissimilar lengths (table III of M. Antonini, M. Barlaud, P. Mathieu and I. Daubechies, "Image coding using wavelet transform," IEEE Trans. Image Proc., vol. 1, no. 2, pp. 205–220, April 1992), and FIG. 6(b) being that of an orthogonal wavelet with extremal phase and highest number of vanishing moments with length 4 (table 6.2 of I. Daubechies, Ten lectures on wavelets. SIAM-CBMS series, SIAM, Philadelphia, 1992)

The rapid decay of the ramp-filtered scaling functions is related to the number of vanishing moments of the scaling function. Orthonormal wavelets corresponding to scaling functions with vanishing moments have been called "coiflets" (by Daubechies in E. Daubechies, *Ten lectures on wavelets*. SIAM-CBMS series, SIAM, Philadelphia, 1992 at section 8.2). For coiflets with 1 and 3 vanishing moments, supported on the interval [0,5], and [0,11], respectively, we have measured spreads with respect to these intervals of 0.016 and 0.013 respectively. These scaling functions correspond to scaling filters with 6 and 12 taps respectively. Daubechies has also observed in Ibid., at section 8.3.5, that the symmetric biorthogonal bases, constructed as taught in M. Antonini, M. Barlaud, P. Mathieu and I. Daubechies, "Image coding using wavelet transform," *IEEE Trans. Image Proc.*, vol. 1, no. 2, pp. 205–220, April 1992, are numerically very close to coiflets. For the biorthogonal "near-coiflet" scaling functions supported on the intervals [0,4], [0,8], and [0,12], we have measured spreads with respect to these intervals of 0.29, 0.016, and 0.0095 respectively. These scaling functions correspond to scaling filters with 5, 9, and 13 taps respectively. When the algorithm is used for optimum resolution is projecting an image, it is most desirable to minimize both the spread of the scaling function and the number of taps in the corresponding filter. Under these criteria, the near-coiflet filter with 5 taps is near optimal (see FIG. 3(a) and (c), and FIG. 6(a)) and this is therefore used in running the simulations under this algorithm.

The measured spreads for various compactly supported wavelet and scaling functions are given in Table I. We have observed that even if g is replaced by scaling function given by (8), $H\partial R_\theta g$ has essentially the same support as $R_\theta g$ for each θ. FIG. 3 shows the Daubechies' biorthogonal wavelet and scaling function (data on which is found at Table III in the Antonini/Barlaud/Mathieu/Daubechies work, supra) as well as the ramp filtered version of these functions. Observe that the ramp-filtered scaling functions has almost the same essential support as the scaling function itself.[1] Therefore, in order to reconstruct the wavelet and scaling coefficients for some wavelet basis, we only need the projections passing through the region of interest plus a margin for the support of the wavelet and scaling ramp filters. Moreover, in order to reconstruct the image from the wavelet and scaling coefficients, we have to calculate these coefficients in the region of interest plus a margin for the support of the wavelet reconstruction filters (13). Since wavelet and scaling ramp filters and also the wavelet reconstruction filters get wider in lower scales, we need to increase the exposure to reconstruct the low resolution coefficients in the region of interest. In the algorithm of this invention, the scaling coefficients can be reconstructed locally, and only one level of the wavelet filter bank used.

[1] This is not the case in general. For example, in FIG. 4 is plotted another wavelet and scanning functions (taken from the data at table 6.2 of Daubechies, previously cited) and their ramp-filtered versions, for comparison. The scaling function in this basis does spread significantly after ramp filtering.

C. Error Analysis

It is mentioned by Natterer, supra, that the error in the interior Radon transform is not negligible because the derivative Hilbert transform (the impulse response of the filter $|\omega|$) is not local in space. This means that in order to reconstruct even a small local region of interest, some data outside the region of interest must be considered in order to get negligible reconstruction error. An upper bound is determined for the reconstruction error, in terms of the amount of non-local data that is considered in the reconstruction. The upper bound of the error in a locally reconstructed image using the described algorithm will also be compared to the upper bound of the error when the standard filter backprojection method with local data is used. For simplicity of notation, we assume that the region of interest, a disc of radius $r_i$ pixels centered at the origin, will be denoted by ROI, and the region of exposure, a disc of radius $r_e$ pixels centered at the origin, will be denoted by ROE. We further assume that the ROI and ROE are centered at the center of the image. Consider the filtered backprojection formula (1), while the ramp filter $|\omega|$ is replaced by a general angle dependent filter $h_\theta(s)$ $$f_r(x,y) = \int_0^\pi (h_\theta(s) * R_\theta f(s))(x\cos\theta + y\sin\theta)d\theta. \qquad (20)$$

We assume that for each angle $\theta \in [0,2])$, the projection data $R_\theta f(s)$ is sampled with a radial sampling interval of $T_s$, and the support of $f$ is a disk of radius R centered at the origin. If $h_\theta(s)$ is chosen to be the impulse response of the ramp filter (2), the reconstructed function $f_r(x,y)$ is an approximation of the function $f$; and if it is the impulse response of the wavelet and scaling ramp filters (19), the reconstructed function $f_r(x,y)$ will be the approximation of the wavelet and scaling coefficients. The discrete version of (20) is given by $$f_r(x,y) = \frac{\pi}{K}\sum_{k=1}^K \frac{1}{R}\sum_{n=-R}^R P_{\theta_k}(n) h_{\theta_k}(m-n),$$

where m=

$$m = \left\lfloor \frac{x\cos\theta + y\sin\theta}{T_s} \right\rfloor \in ROE,$$

K is the total number of evenly spaced angles at which the projections are measured, $P_{\theta_k}(n)$ is the projection $$R_{\theta_k} f\left(\frac{\pi}{T_s}\right), \text{ and } \theta_k = k\frac{\pi}{K}.$$

We can divide the inner summation into two parts, corresponding to the ROE and its complement $\overline{ROE}$.

$$f_r(x,y) = \frac{\pi}{K}\sum_{k=1}^K \frac{1}{R}\sum_{|n|\leq r_e} P_{\theta_k}(n) h_{\theta_k}(m-n) +$$

$$\frac{\pi}{K}\sum_{k=1}^K \frac{1}{R}\sum_{|n|>r_e} P_{\theta_k}(n) h_{\theta_k}(m-n).$$

Thus the magnitude of error using only ROE is given by $$|e(x,y)| = \left| \frac{\pi}{K}\sum_{k=1}^K \frac{1}{R}\sum_{|n|>r_e} P_{\theta_k}(n) h_{\theta_k}(m-n) \right|.$$

To get an upper bound for the error we use the Cauchy-Schwartz inequality as $$|e(x,y)| = \left| \frac{\pi}{K}\sum_{k=1}^K \frac{1}{R}\sum_{|n|>r_e} P_{\theta_k}(n) h_{\theta_k}(m-n) \right| \leq$$

$$\frac{\pi}{K}\sum_{k=1}^K \frac{1}{R}\sum_{|n|>r_e} |P_{\theta_k}(n) h_{\theta_k}(m-n)| \leq$$

$$\frac{\pi}{K}\sum_{k=1}^K \frac{1}{R}\left(\sum_{|n|>r_e} |P_{\theta_k}(n)|^2\right)^{1/2}\left(\sum_{|n|>r_e} |h_{\theta_k}(m-n)|^2\right)^{1/2}.$$

If we assume that the support of $f(x,y)$ is in the disc of radius 1, then $|P_{\theta_k}(n)| \leq 2\max|f(x,y)|$. Hence $$|e(x,y)| \leq \frac{2\sqrt{2}\pi}{K}\max|f(x,y)|\frac{\sqrt{R-r_e}}{R}\sum_{k=1}^K \left(\sum_{|n|>r_e}|h_{\theta_k}(m-n)|^2\right)^{1/2}.$$

We define the relative error as $$|e_{rel}(x,y)| = \frac{|e(x,y)|}{\max|f(x,y)|},$$

then $$|e_{rel}(x,y)| \leq \frac{2\sqrt{2}\pi}{K}\frac{\sqrt{R-r_e}}{R}\sum_{k=1}^K \left(\sum_{|n|>r_e}|h_{\theta_k}(m-n)|^2\right)^{1/2}. \qquad (21)$$

In the worst case the region of interest is a single point. Thus we may bound 21) by $$|e_{rel}(x,y)| \leq \frac{2\sqrt{2}\pi}{K}\frac{\sqrt{R-r_e}}{R}\sum_{k=1}^K \left(\sum_{|n|\geq r_e-r_i}|h_{\theta_k}(n)|^2\right)^{1/2}.$$

We define $h^T_{\theta_k}$, the truncated filter, as $$h^T_{\theta_k}(n) = \begin{cases} h_{\theta_k}(n) & |n| < r_e - r_i \\ 0 & \text{otherwise} \end{cases}.$$

Therefore $$|e_{rel}(x,y)| \leq \frac{2\sqrt{2}\pi}{K}\frac{\sqrt{R-r_e}}{R}\sum_{k=1}^K \left(\sum_{n=-R}^R |h_{\theta_k}(n) - h^T_{\theta_k}(n)|^2\right)^{1/2}.$$

The inner sum can be written in the frequency domain. That is, $$|e_{rel}(x, y)| \leq \frac{2\sqrt{2}\pi}{K} \frac{\sqrt{R-r_e}}{R} \sum_{k=1}^{K} \left( \sum_{l=-R}^{R} |H_{\theta_k}(l) - H^T_{\theta_k}(l)|^2 \right)^{1/2}, \quad (22)$$

where $H_{\theta_k}$ and $H^T_{\theta_k}$ are the Fourier transform of $h_{\theta_k}$ and $h^T_{\theta_k}$, respectively.

Figures 5A, 5B:
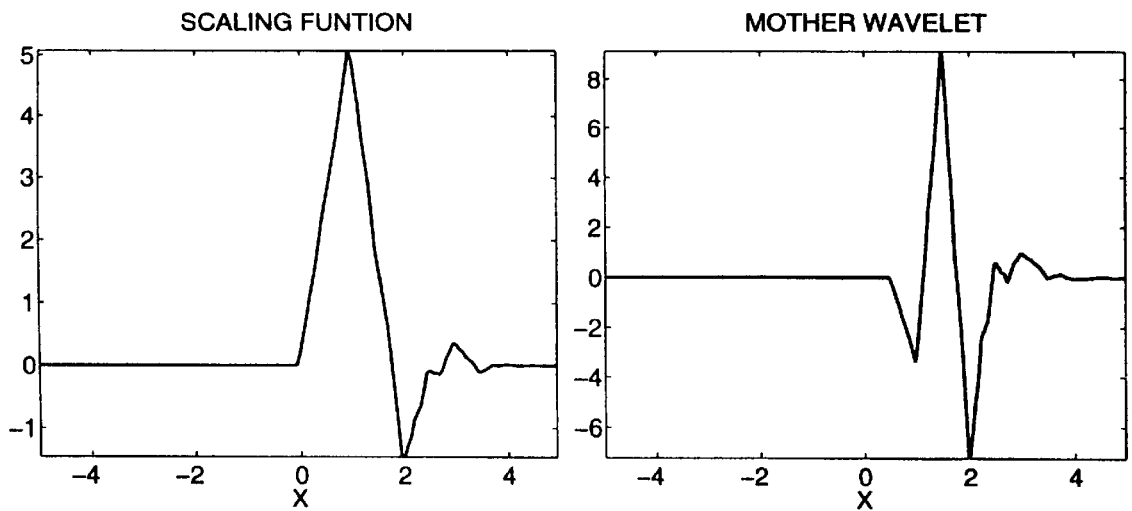
FIGS. 5(a)–(d) are plots showing characteristics of a wavelet with extremal phase and highest number of vanishing moments with length 4, with FIGS. 5(a) and 5(b) being characteristics of this wavelet's scaling function and mother wavelet, respectively, and FIGS. 5(c) and 5(d) being characteristics of its rampled scaling function and rampled mother wavelet, respectively.
Figures 5C, 5D:
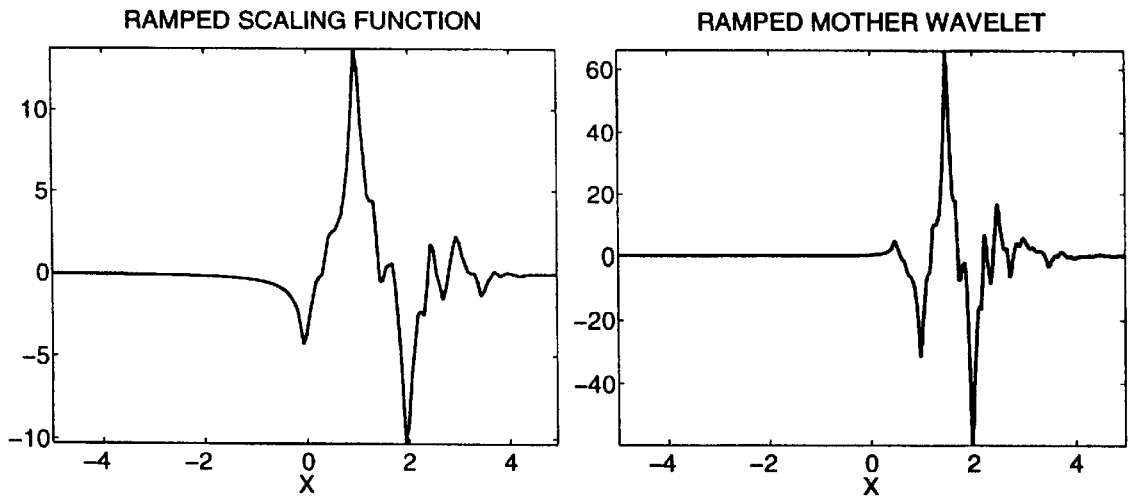

In order to calculate the upper bound of the error in standard filter backprojection method we replace $h_{\theta_k}$ in (22) by the ramp filter (2). The upper bound for the error in the reconstruction of wavelet and scaling coefficients can be obtained by replacing $H_{\theta_k}$ in (22) with (19). In our algorithm, the scaling and wavelet coefficients at resolution $2^{-1}$ are reconstructed directly from the projection data. The recovered coefficients are then filtered by the reconstruction filters (130 to obtain the original image. To consider the effect of the wavelet reconstruction filter bank in the error upper bound, we move these filters to the projection domain, i.e., $$|e_{rel}(x, y)| \leq \frac{2\sqrt{2}\pi}{K} \frac{\sqrt{R-r_e}}{R} \sum_{k=1}^{K} \left( \sum_{l=-R}^{R} |E^A_{\theta_k}(l)|^2 \right)^{1/2} + \quad (23)$$

$$\left( \sum_{l=-R}^{R} |E^{D1}_{\theta_k}(l)|^2 \right)^{1/2} + \left( \sum_{l=-R}^{R} |E^{D2}_{\theta_k}(l)|^2 \right)^{1/2} + \left( \sum_{l=-R}^{R} |E^{D3}_{\theta_k}(l)|^2 \right)^{1/2},$$

where $$E^A_{\theta_k}(l) = F^A_{\theta_k}(l) - F^{A^T}_{\theta_k}(l)$$

$$E^{D^i}_{\theta_k}(l) = F^{D^i}_{\theta_k}(l) - F^{D^{iT}}_{\theta_k}(l), \quad i=1, 2, 3$$

where $F^A_{\theta_k} = H^A_{\theta_k} H^A_r (1 \cos \theta, 1 \sin \theta)$ and $F^{D^i}_{\theta_k} = H^{D^i}_{\theta_k} H^{D^i}_r (1 \cos \theta, 1 \sin \theta)$, with $H^A_{\theta_k}, H^{D^1}_{\theta_k}, H^{D^2}_{\theta_k}$ and $H^{D^3}_{\theta_k}$ being the rampled scaling and wavelet filters (19), $H^A_r, H^{D^1}_r, H^{D^2}_r$, and $H^{D^3}_r$ the wavelet reconstruction filters (13), and $F^{A^T}_{\theta_k}, F^{D^{iT}}_{\theta_k}, i=1, 2, 3$ the truncated version of the filters $F^A_{\theta_k}$ and $F^{D^i}_{\theta_k}, i=1, 2, 3$. The normalized upper bound of the relative error in the reconstructed image, versus the amount of non-local data $(r_e - r_i)$, is depicted in FIG. 5. These bounds are given by (22) and (23) for the standard filter backprojection method and the novel algorithm, respectively. The horizontal axis in FIG. 5 shows the amount of non-local data that is collected in order to reconstruct the region of interest.

D. Interior Problem

The interior problem in even dimensions is not uniquely solvable, since there are non-zero functions which have zero projections on the ROE. Clearly, the novel algorithm will be unable to reconstruct such a function. It has been noted that these functions, which are in the null-space of the interior problem, do not vary much well inside the ROE (as Natterer explains, supra).

Figure 8A:
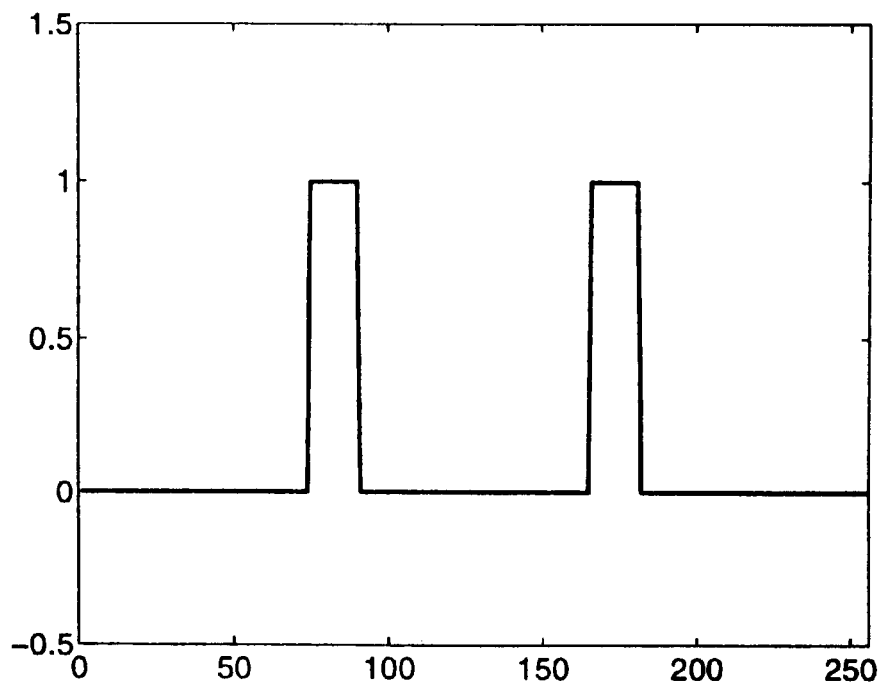
FIG. 8 presents plots on the projection of a null-space element [FIG. 8(a)] and the reconstruction of the null-space element [FIG. 8(b)].
Figure 8B:
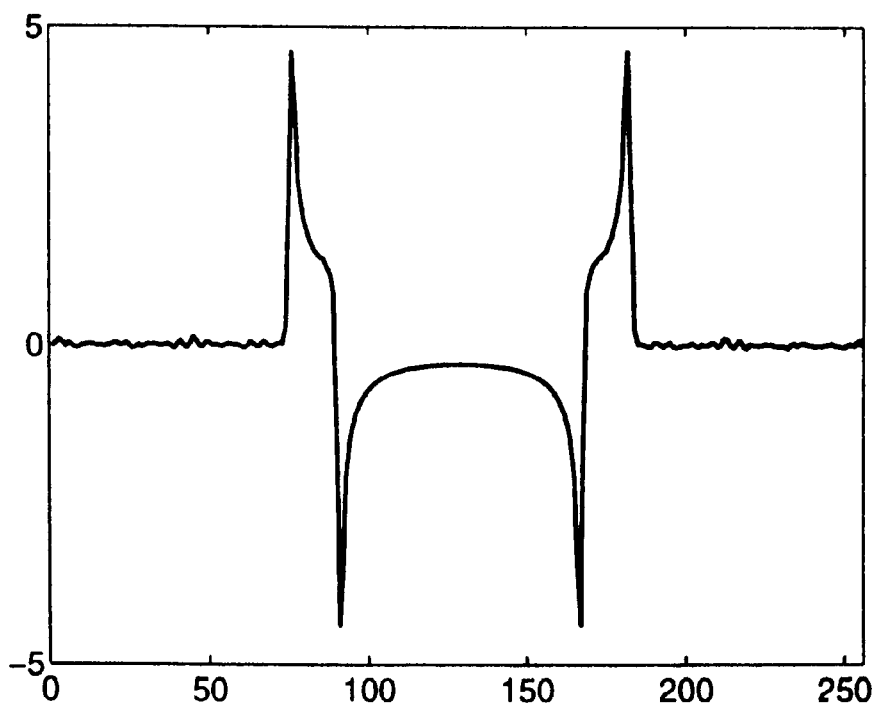

To illustrate this, an element of the null-space is reconstructed and the variation of this element on the ROI is measured. Assume that the ROI is the interior 32 pixels of the image and ROE is the ROI plus a margin of 22 pixels in each side. This margin shows the amount of nonlocal data used in the reconstruction scheme. FIG. 7(b) shows a slice of a circularly symmetric element of the null-space. The projection of this element for each angle is shown in FIG. 7(a). The projections are zero inside the ROE, which is the interior 76 pixel of the projections, and one in 16 pixels at each side of the ROE. The measured maximum variation of the null-space on the ROI is less than 1 percent. Two measurement criteria are considered for the error in the local reconstruction: the maximum error and the average error. Since in the invention's approach most of the error occurs in a small ring at the boundary of the region of interest, the average error is an order of magnitude smaller than the maximum error. The maximum error and the average error of the null-space element on the ROI versus the amount of nonlocal data (the difference of the radius of the ROE and ROI) is shown in FIG. 8. The size of extra margin to collect the non-local data is determined depending on whether the average error or the maximum error is to be limited. In order to limit the maximum error to 1%, we require a margin of 22 pixels, and in order to limit the average error to 1%, we require a margin of 12 pixels.

In the following Section E a method is described to reduce the error at the boundaries of the ROI. In consequence, the amount of error is much smaller than the upper bound predicted by the null space element energy in the ROI. In Section H, simulation results presented document that the reconstruction of the ROI using only 12 pixels of extra margin results in a reconstruction with negligible error in the ROI.

Here the amount of exposure versus the size of ROI is calculated in the method of the invention and compared to previous methods. Let the support of reconstruction filters in the wavelet filter bank be $2r_r$ samples. Assume an extra margin of $2r_m$ samples in the projection domain, and denote the radius of the region of interest by $r_i$. The radius of the region of exposure is $r_e = r_i + r_m + r_r$ pixels. The amount of exposure in the invention's algorithm normalized to the full exposure is given by $$\frac{r_r + r_m + r_i}{R}.$$

Figure 6B:
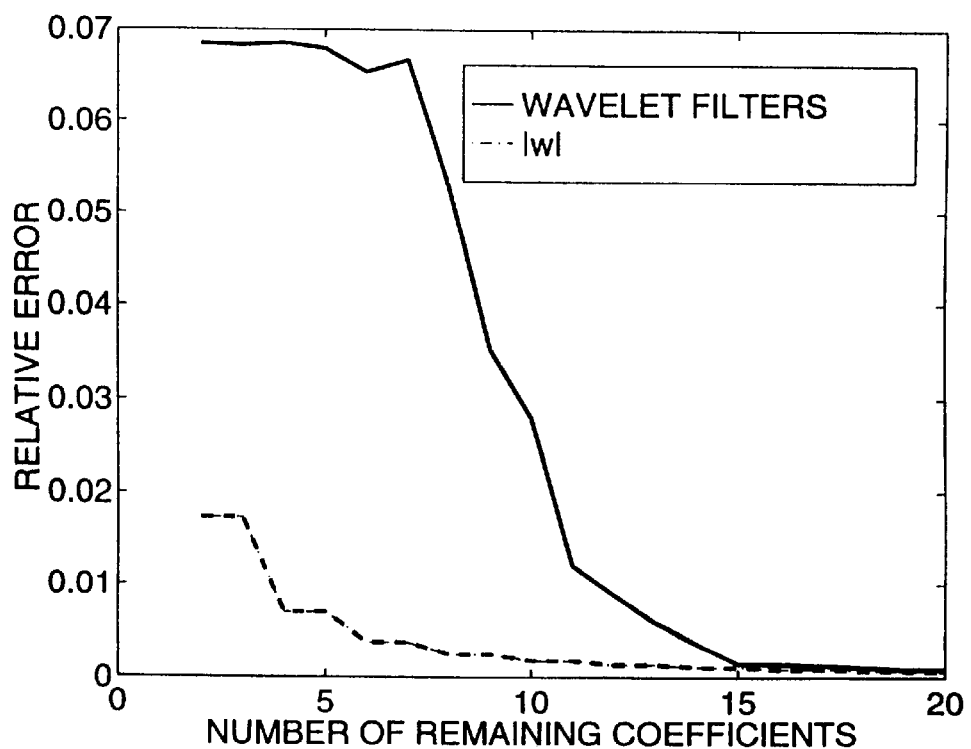

The amount of exposure in this algorithm with $r_m + r_r = 10$ pixels and $r_m + r_r = 22$ pixels is plotted in FIG. 6.

In comparison, the amount of exposure using the Delaney/Bresler algorithm, supra, is given by $$2^{-L} + \sum_{q=1}^{L} 2^{-q+1} \left( \frac{r_r + r_m + R_i}{R} \right),$$

where L is the number of levels in the wavelet filter bank. Similar exposure is required in the DeStefano/Olson algorithm, supra. FIG. 6 shows the relative amount of exposure versus the size of the region of interest in a 256×256 image for $r_m + r_r = 12$ pixels for these methods. Also the amount of exposure for the algorithm used in Olson, supra, is plotted for comparison. All of the exposures in FIG. 6 are divided by two if interlaced sampling is used.

E. Practical Considerations

Figure 9:
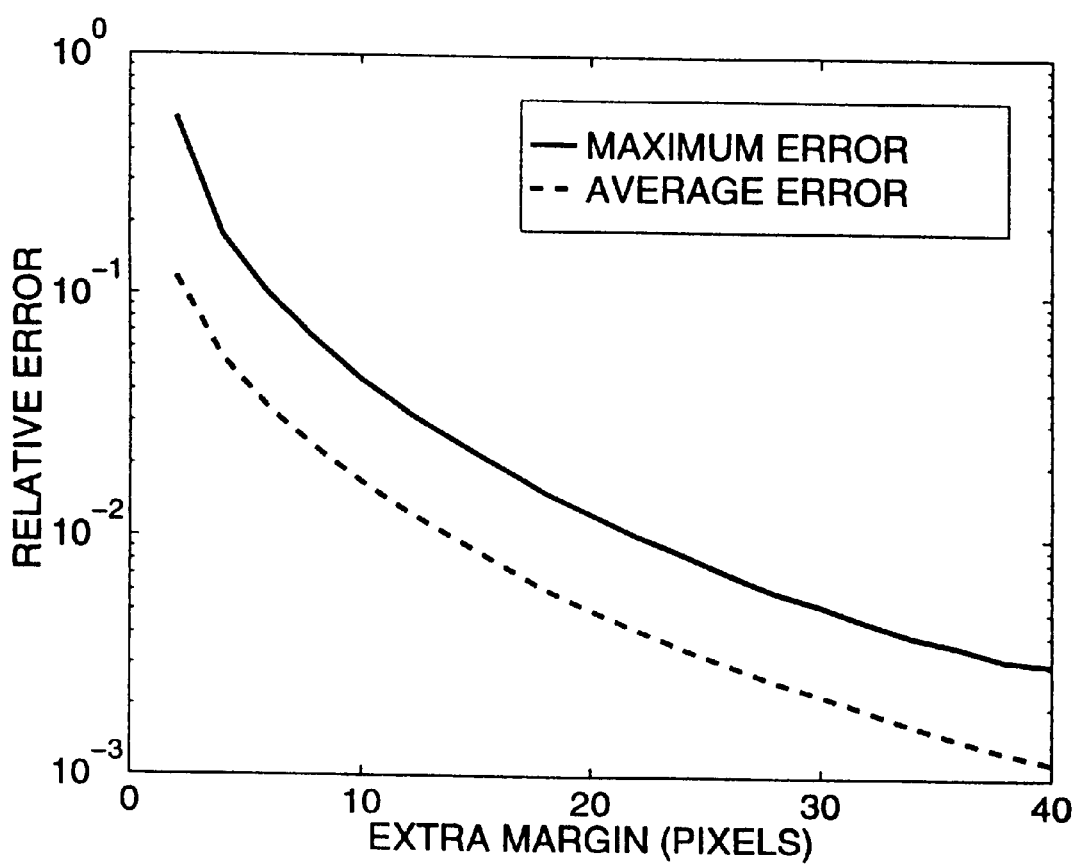
FIG. 9 is a graph containing two error data lines that show maximum error and average error as a function of the amount of non-local data used in the reconstruction scheme.
Figure 13:
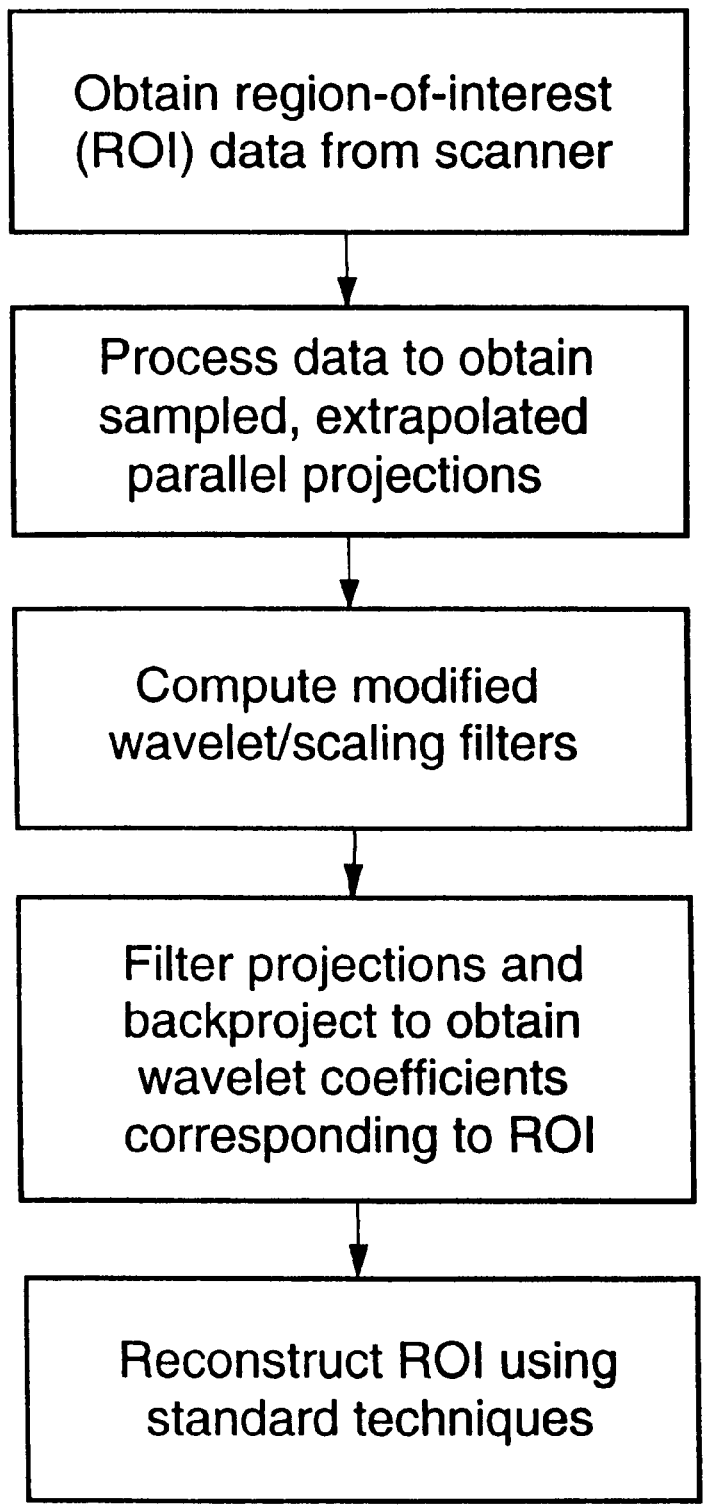
FIG. 13 is a flowchart diagram of the method disclosed herein for processing local tomographic data in the parallel beam format.

In local reconstruction, artifacts are common close to the boundary of the region of exposure. To illustrate this, and with reference to FIG. 13, consider the Shepp-Logan head phantom and an ROE of diameter 32 pixels at the center of the image. The projections outside the ROE are set to zero (FIG. 9(c)) and filtering part of the filter backprojection formula (2) is applied to the remaining projections. FIG. 9(d) shows the artifacts that appear at the borders of the region of exposure. When the backprojection formula is applied to the filtered projections, these artifacts cause large errors at the borders of the region of exposure in the reconstructed image.

In order to avoid the artifacts, the projections are extrapolated continuously to be constant on the missing projections. The extrapolation scheme is the same even when the region of exposure is not centered. Let the region of exposure, which is the subset of projections on which $R_\theta f$ is given, be a circle of radius $r_e$ whose center is located at polar coordinates $(r,\theta_0)$, i.e., $$\text{ROE: } \{s : s \in [r\cos(\theta-\theta_0)-r_e, r\cos(\theta-\theta_0)+r_e]\}. \quad (24)$$

We use the constant extrapolation $$(R_\theta)_{local}(s) = \begin{cases} R_\theta(s) & \text{if } s \in ROE \\ R_\theta(r\cos(\theta-\theta_0)+r_e & \text{if } s \in [r\cos(\theta-\theta_0)+r_e, +\infty) \\ R_\theta(r\cos(\theta-\theta_0)-r_e & \text{if } s \in (-\infty, r\cos(\theta-\theta_0)-r_e] \end{cases} \quad (25)$$

FIG. 9(e) and FIG. 9(f) show an extrapolated projection and its ramp-filtered version (2), respectively. When the ramp filer is applied to the extrapolated projection, there is no spike at the edge of the region of exposure. The comparison with the ramp-filtered version of the projection using global data (FIG. 9(b)) shows that the filtered projection has a constant bias different compared to the one using global data. This is natural in local tomography and, after backprojection of all projections, it appears as a constant bias in the locally reconstructed image (as the works of Natterer and of Louis/Rieder, both supra, have recognized). Natterer, for example, suggests to estrapolate the data outside the region of interest using a minimum norm approach which has the same effect on the artifacts (cf. FIG. VI.8 in Natterer, supra).

F. Implementation of the Algorithm to Reconstruct and Image

We assume the support of the image is a disc of radius R, and the radius of the region of interest is $r_i$. A region of radius $r_e = r_i + r_m + r_r$ is exposed, where $r_m$ and $r_r$ are the extra margins due to the support of the decomposition filters in the projection domain and the reconstruction filters in the image domain, respectively. Suppose the projections are sampled at N evenly spaced angles.

Referring again to FIG. 13, there is presented a flow chart showing the steps of the method of the invention when the wavelet is applied to local, or region-of-interest (ROI) data.

1. The region of exposure of each projection is filtered by modified wavelet filters (19), at N angles. The complexity of this part, using FFT, is $9/2 Nr_e \log r_e$.
2. The bandwidth of the projections is reduced by half after filtering with modified scaling filters. Hence we use N/2 of the projections at evenly spaced angles. These projections are extrapolated to $4r_e$ pixels, using (25), and are then filtered by modified scaling filters. The complexity of filtering part using FFT is $3N(4r_e) \log 4r_e$.
3. Filtered projections are obtained in step 1 and 2 and are backprojected to every other point, using (16), to obtain the approximation (17) and detail (18) coefficients at resolution $2^{-1}$. The remaining points are set to zero. The complexity of this part, using linear interpolation is $7N/2(r_i+2r_r)^2$.
4. The image is reconstructed from the wavelet and scaling coefficients by (12). The complexity of filtering is $4(2r_i)^2(3r_r)$.

Figure 14:
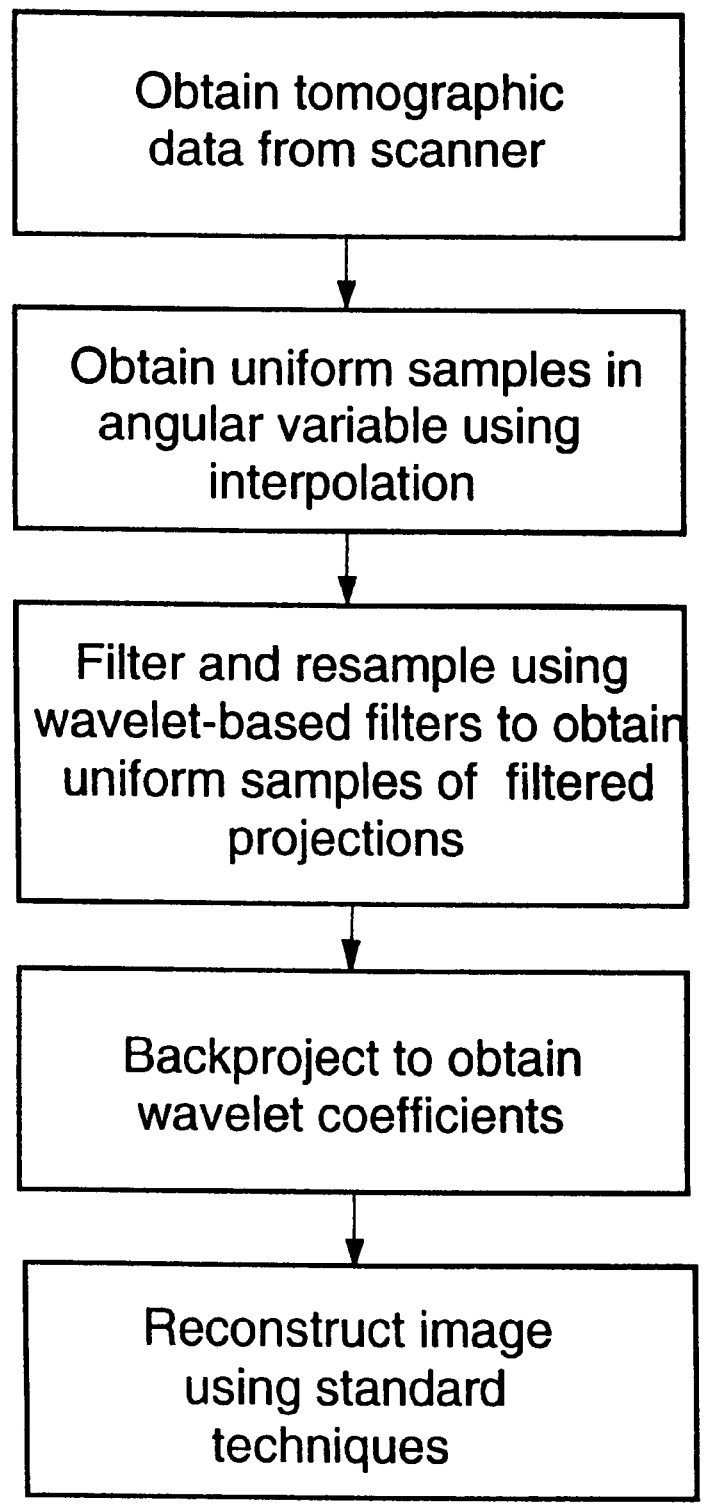
FIG. 14 is a flowchart diagram of the method disclosed herein for processing local tomographic data in the fan beam format.
Figure 15:
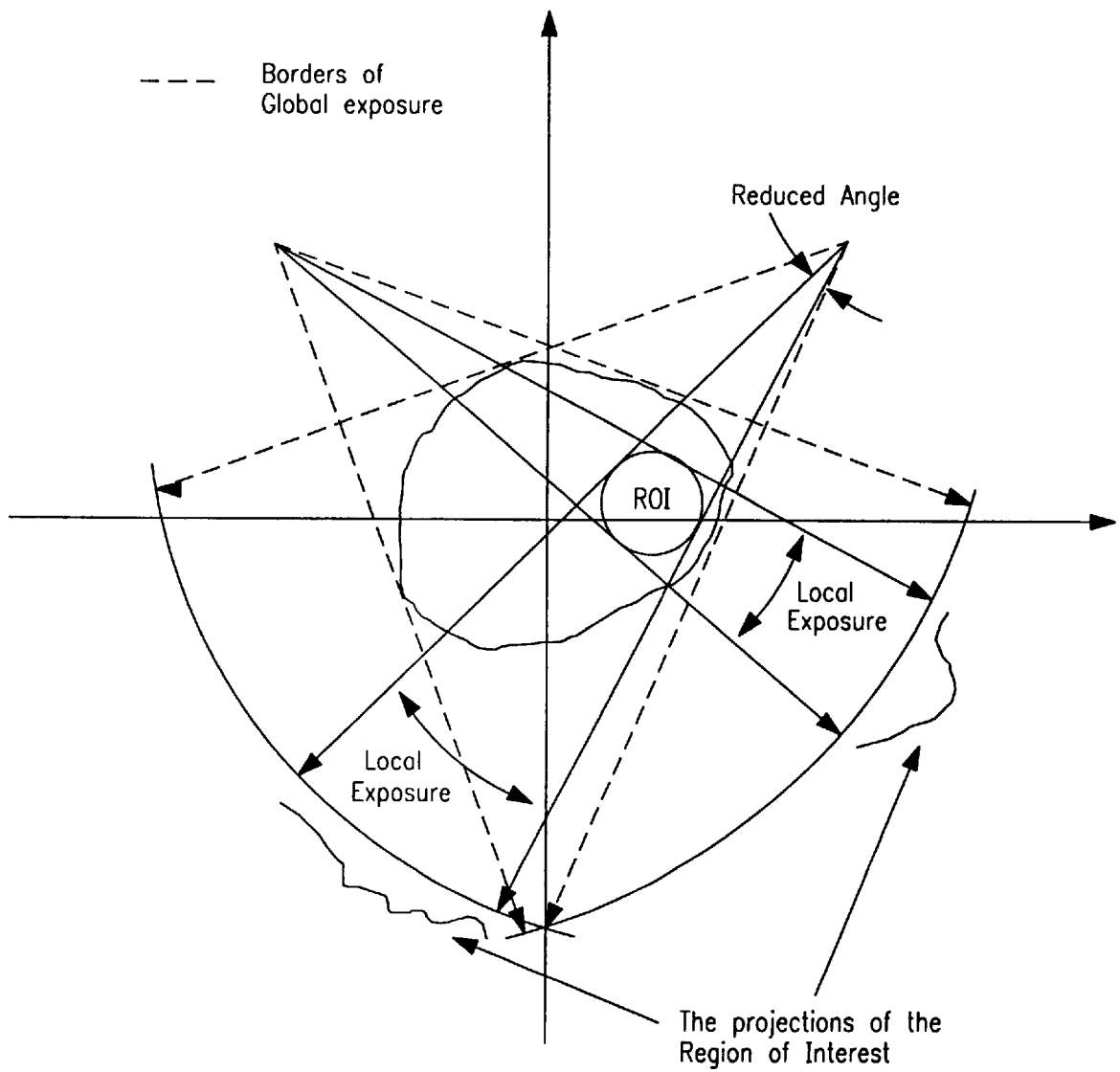
FIG. 15 is a depiction of radiation beams of various angles about a subject showing exposure of only the region of interest.
Figure 16:
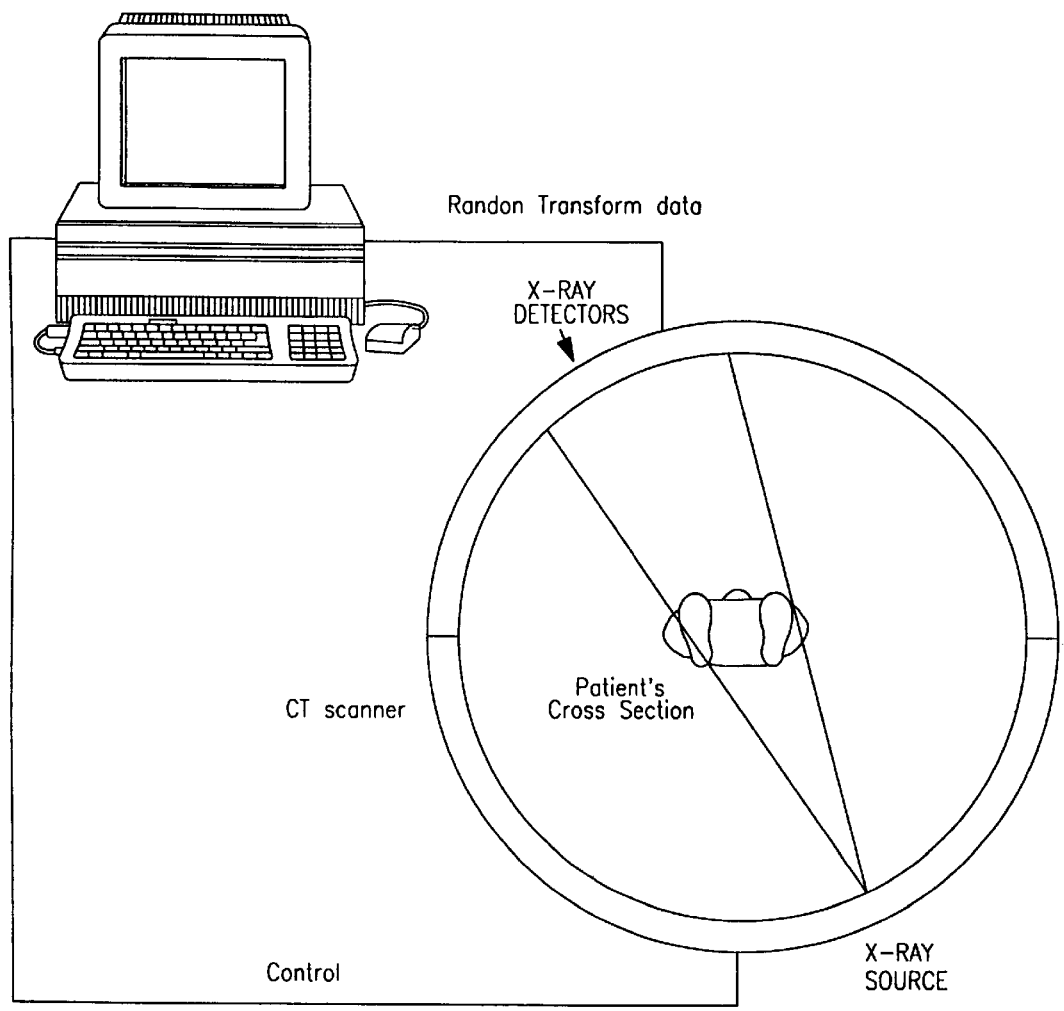
FIG. 16 is a pictorial depiction of a CT scanning system focused in a medial environment on a patient.

The above description assumes that the data is collected in a parallel beam format. The algorithm of the invention is equally applicable to fan-beam data. Referring now to FIG. 14, there is presented a flow chart showing the steps of the method of the invention for the described algorithm as applied to fan-beam data. Since fan-beam data is known to those skilled in this art, it is unnecessary to detail its characteristics here. See for example "Local Tomography in Fan-beam Geometry Using Wavelets," supra.

G. Comparison with Conventional Reconstruction

Figure 10A:
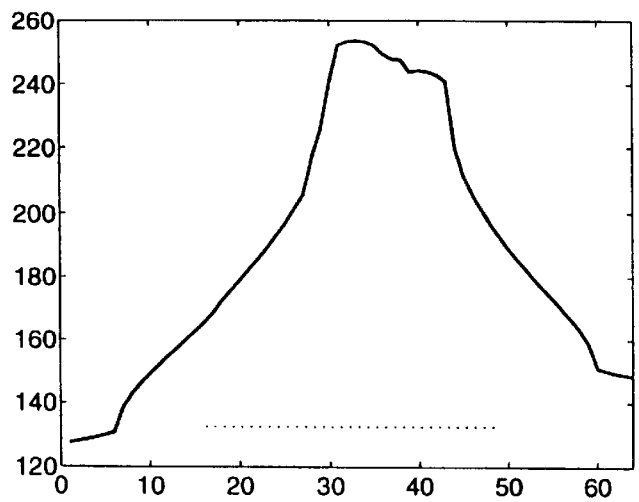
FIGS. 10(a)–(f) are six graphs that show, in FIG. 10(a), a sample projection of the Shepp-Logan head phantom.
Figure 10B:
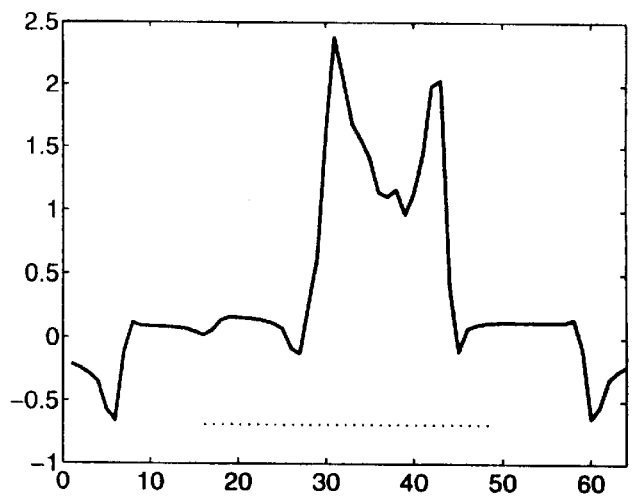
Figure 10C:
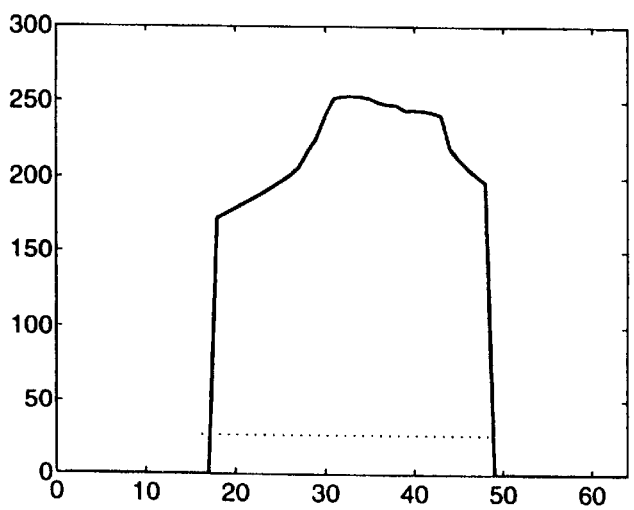
Figure 10D:
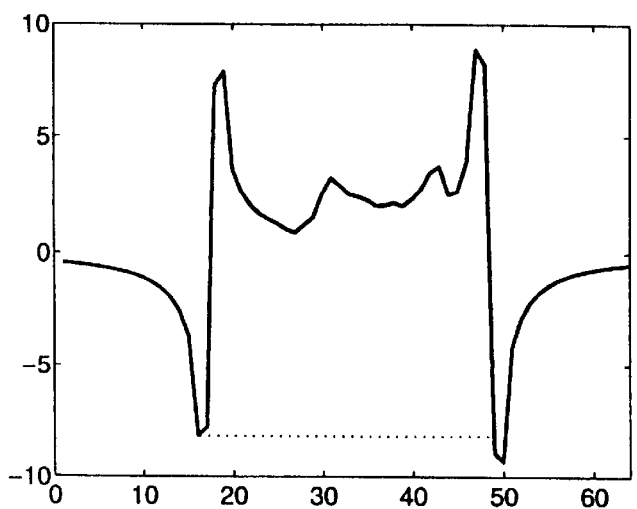
Figure 10E:
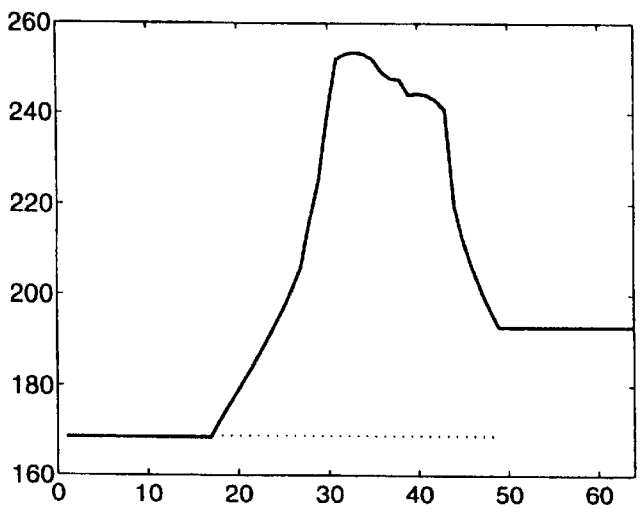
Figure 10F:
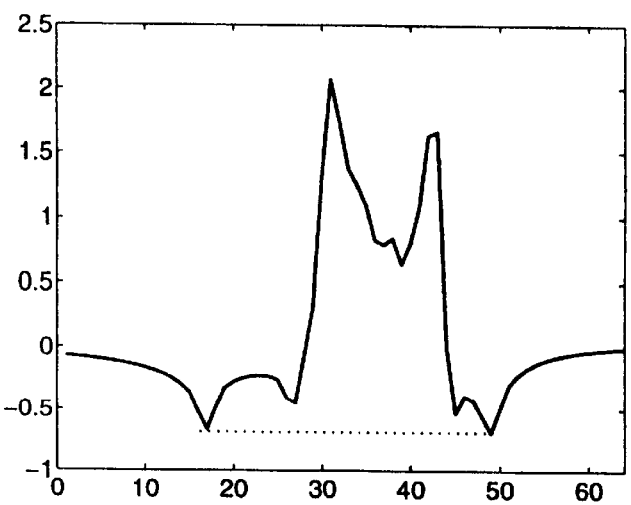

The complexity of the filtering part of the described algorithm has been compared with the filtered backprojection method and the algorithm taught by Delaney/Bresler, supra. FIG. 10(a) shows the complexity of each method as a function of the radius of the region of interest. The complexity of the algorithm presented herein and the algorithm proposed by Delaney/Bresler are both less than the standard filtered backprojection method when the size of the ROI is small. But as the radius of the ROI is increased, the complexity of both algorithms exceeds that of filtered backprojection, since in both methods filtering has to be applied for different resolutions. However, the complexity of this invention's algorithm is smaller than Bresler/Delaney's algorithm because of smaller length of projections. If linear interpolation is used at the backprojection part, the total complexity depends on the backprojection part which is almost the same in all of the above methods. FIG. 10(b) shows the total complexity of different methods. If in the backprojection step another method is used, like the nearest neighbor, the total complexity mostly depends on the filtering part and this invention's algorithm can reduce the complexity compared to the method in Delaney/Bresler.

H. Simulation Results

Figure 11A:
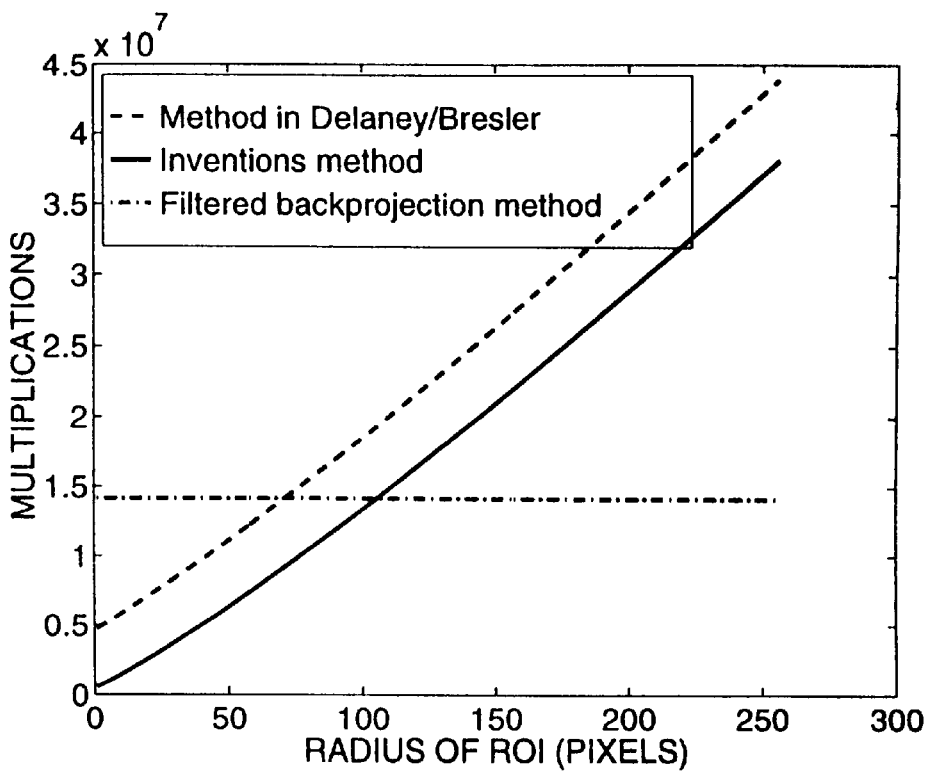
FIGS. 11(a) and (b) show graphs depicting the complexity of filtering part, and the total complexity, respectively.
Figure 11B:
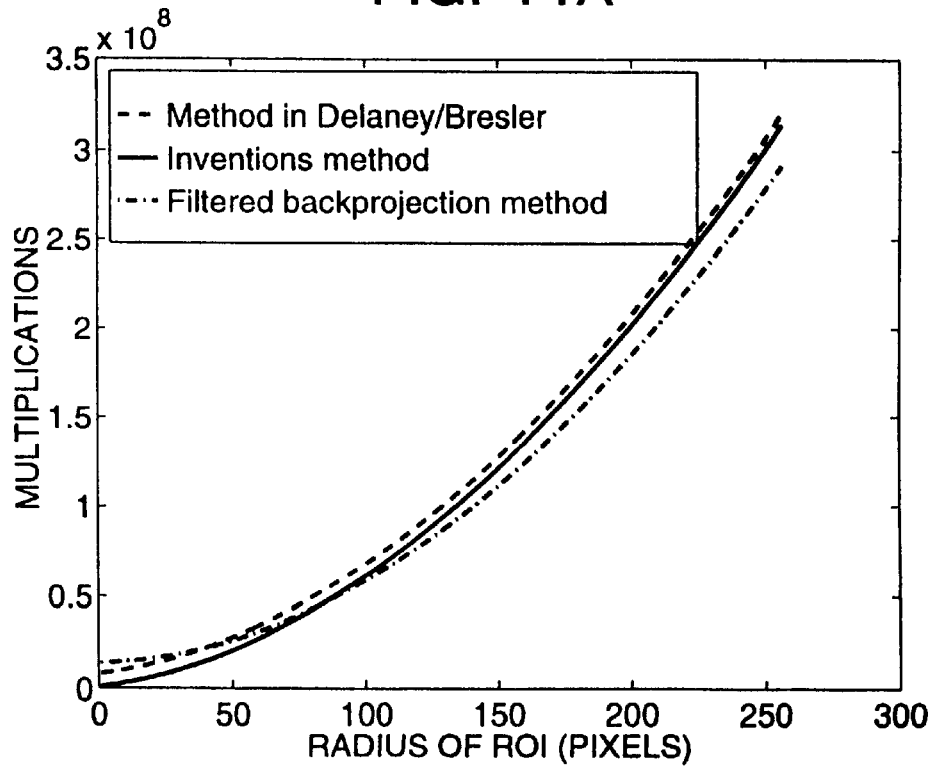

We have obtained the wavelet and scaling coefficients of the 256×256 pixel image of the Shepp-Logan head phantom using global data (FIG. 11). In this decomposition, the Daubechies' biorthogonal basis was used (table III of Antonini/Barlaud/Mathieu/Daubechies, supra). The quality of the reconstructed image is the same as with the filtered backprojection method. An example in which a centered disk of radius 16 pixels is reconstructed using the local reconstruction method described in this disclosure. The blow up of the ROI using both standard filtered backprojection using global data and local reconstruction for comparison was examined. In this example the projections are collected from a disk of radius 28 pixels. Therefore, the amount of exposure is 22% of the convention filtered backprojection method. We have observed a constant bias in the reconstructed image which is natural in the interior reconstruction problem (confirmed by Natterer, and Louis/Rieder, both previously cited). In the above example, the mean square error between the original image and the locally reconstructed image after removing bias is computed over the region of interest.[2] The error energy in the reconstructed image is the same as that when using the filtered backprojection method with full exposure data.

[2] The means square error is calculated using this equation $$\frac{1}{N} \sum_{(n,m):(n,m) \in ROI} (f(n,m) - \hat{f}(n,m))^2,$$

where $f$ is the original image, $\hat{f}$ is the reconstructed image with the constant bias removed, and N is the number of pixels in the ROI.

The disclosed method is applied to the real data obtained from a CT scanner. In the local reconstruction even with 12 pixels extra margin, the reconstructed image has the same quality as the filtered backprojection method. A 1024×1024 scan of heart reconstructed from projections was sampled at 720 angles over 180 degrees with each projection consisting of 1024 samples covering a reconstruction diameter of 47.5 cm. Using the described algorithm, a local centered region of radius 128 pixels of this scan has been reconstructed by using only 27% of exposure. The reconstruction in the region of interest is as good as what can be obtained using the filtered backprojection method which involves global data and 100% exposure. The blow up of the region of interest reconstructed by (1) the invention's local method and (2) the global standard filtered backprojection method was compared.

In order to make an accurate comparison with other methods, most notably those described by DeStefano/Olson, Delaney/Bresler, and Olson, consider two measurement criteria for the error in local reconstruction, (a) the maximum relative error (21) and (b) the average relative error. Since most of the error in our reconstructions occurs in a small ring at the boundary of the region of interest, the average error is an order of magnitude smaller than the maximum error. This determination is based on the examination of a typical element of the nullspace of the interior Radon transform. Based on the examination of this element, and on other considerations, we fix the size of the margin outside of the region of interest on which we collect data. In order to limit the maximum error to 1%, a margin of 22 pixels is required, and in order to limit the average error to 1%, a margin of 12 pixels is required (FIG. 8). Since extrapolating is being done in addition to collecting non-local data, the actual error is much smaller than the values predicted by examining the nullspace element. Hence, the 1% average error criterion is the most reasonable in light of the nature of this disclosed algorithm. Therefore, the 12 pixel margin is used in the simulations, but comparisons are also reported based on the 22 pixel margin.

Accordingly, the described algorithm reconstructs the wavelet and scaling coefficients of a function from its Radon transform. Based on the observation that for some wavelet bases with sufficiently many zero moments, the scaling and wavelet functions have essentially the same support after ramp filtering, a local reconstruction scheme has been developed to reconstruct a local region of a cross section of a body with essentially local data. An upper bound for the local reconstruction error is obtained in terms of the amount of non-local data which is used in the reconstruction scheme. Non-uniqueness of the interior problem appears as a constant bias in the reconstructed image. The measured error between the original image and the reconstructed image after removing this bias is negligible. This fact shows that if a sufficient amount of non-local data is used in the reconstruction, this bias is reasonably constant on the region of interest.

It is also envisioned that the present invention may be used in conjunction with existing wavelet-based image processing algorithms including but not limited to image compression, noise reduction, edge detection, or singularity detection as a means of more accurately and efficiently constructing the wavelet transform of an image directly from the tomographic data without first reconstructing the image.

It is further envisioned that the present invention may be implemented in a format other than in software as presently contemplated. Current and new technology development may, for example, make practical the layered deposition in integrated circuitry of the disclosure of this invention.

Although the invention is described with reference to the presently preferred embodiments, it is understood that the invention as defined by the claims is not limited to these described embodiments. Various other changed and modifications to the invention will be recognizes by those skilled in this art and will still fall within the scope and spirit of the invention, as defined by the accompanying claims.

We claim:

1. A method for processing data form a tomographic system to obtain an image of an object comprising the steps of (a) collecting tomographic data from a CT scan of said object; (b) processing said tomographic data to obtain sampled parallel beam data (c) computing modified wavelet and scaling filters; and (d) processing said sampled parallel beam data using said modified wavelet and scaling filters to construct an image of said object.

2. A method of claim 1, wherein said object is contained within a larger body.

3. A method of claim 1, wherein said output is displayed as an image of said object.

4. A method of claim 1, wherein said tomographic data (b) is selected from a larger data set obtained from said CT scan.

5. An apparatus for producing an image of a region contained within an object, said apparatus comprising: (a) a radiation source focusable on a region contained within an object and producing a focused radiation beam; (b) a receptor means for receiving said radiation beam form said radiation source, said radiation beam having passed through said region positioned between said radiation source and said receptor; (c) a converter means for converting said received radiation beam at the receptor to digitized data; (d) a computer means connected to said converter means comprising data processing means for converting said digitized data into a visual image; and (e) an output means connected to said computer means for displaying the output of said data processing means.

6. An apparatus of claim 5, wherein said data processing means is a computer source code.

7. An apparatus of claim 5, wherein said data processing means is a logic circuit.

8. An apparatus of claim 5, wherein said focusable radiation source is effective to aim a fan-beam from said radiation source at said receptor means.

9. An apparatus of claim 5, wherein said radiation source is an X-ray source.

10. An apparatus of claim 5, wherein said region comprises an edge.

11. An apparatus of claim 5, wherein said data processing means comprises wavelet and scaling filters.

12. An apparatus for producing an image of an object:

(a) a radiation source producing a radiation beam;

(b) a means for collecting data from said radiation source, wherein said data is collected after said radiation beam has passed through said object;

(c) a first means for computing wavelet and scaling filters;

(d) a second means for processing said data using wavelet and scaling filters effective to construct an image of said object; and (e) a display means for displaying an image said object.

13. An apparatus of claim 12, wherein said data is collected as parallel beam data.

14. An apparatus of claim 12, wherein said data is collected as fan-beam data and said system further comprises a third means for converting fan-beam data into parallel beam data, which parallel beam data is processed using wavelet and scaling filters by said second means.

15. An apparatus of claim 12, wherein said radiation source is focusable to produce a focused radiation beam.

* * * * *